(12) United States Patent
Suzuki

(10) Patent No.: US 10,543,781 B2
(45) Date of Patent: Jan. 28, 2020

(54) LIGHT-EMITTING DEVICE

(71) Applicant: TS TECH CO., LTD., Asaka-shi, Saitama (JP)

(72) Inventor: Masanori Suzuki, Nasukarasuyama (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/005,925

(22) Filed: Jun. 12, 2018

(65) Prior Publication Data

US 2018/0290588 A1 Oct. 11, 2018

Related U.S. Application Data

(63) Continuation of application No. 15/374,371, filed on Dec. 9, 2016, now Pat. No. 10,017,108, which is a (Continued)

(51) Int. Cl.
*B60Q 3/51* (2017.01)
*F21V 5/04* (2006.01)
(Continued)

(52) U.S. Cl.
CPC ............... *B60Q 3/51* (2017.02); *B60Q 3/64* (2017.02); *B60Q 3/80* (2017.02); *F21V 5/04* (2013.01); *F21V 17/164* (2013.01); *F21V 19/0035* (2013.01); *G02B 6/0001* (2013.01); *G02B 6/0006* (2013.01); *B60Q 3/74* (2017.02); (Continued)

(58) Field of Classification Search
CPC ... B60Q 3/51; B60Q 3/64; B60Q 3/74; B60Q 3/80; F21V 17/64; F21V 19/0035; F21V 2200/00; F21Y 2115/10; G02B 6/0001; G02B 6/0006; G02B 6/423; G02B 6/4242; F21S 43/237
See application file for complete search history.

(56) References Cited

U.S. PATENT DOCUMENTS 4,760,218 A 7/1988 Gutman
7,452,110 B2 11/2008 Chen
(Continued)

FOREIGN PATENT DOCUMENTS

DE 10 2006 045 271 A1 3/2008
JP H05-318826 A 12/1993
(Continued)

OTHER PUBLICATIONS

DE 102006045271, Mar. 27, 2008, English Translation.*

*Primary Examiner* — Peggy A Neils
(74) *Attorney, Agent, or Firm* — Carrier Blackman & Associates, P.C.; Joseph P. Carrier; Anne G. Sabourin

(57) ABSTRACT

A light-emitting device includes a board, a light-emitting element mounted on a surface of the board, a support member on which the board is placed, and a cover having a plate shaped main cover body covering the light-emitting element and a tubular portion which receives a light guide body that guides light emitted from the light-emitting element. The main cover body includes a base, a protrusion protruding from the base toward the board, and a ridge disposed on a protruded end of the protrusion. A step is formed by the protrusion and the ridge, and the protrusion and the ridge extend in a same direction along the base.

17 Claims, 21 Drawing Sheets

Related U.S. Application Data continuation of application No. 14/399,613, filed as application No. PCT/JP2012/061924 on May 9, 2012, now Pat. No. 9,551,821.

(51) Int. Cl.

| | | |
|---|---|---|
| *F21V 17/16* | (2006.01) | |
| *F21V 19/00* | (2006.01) | |
| *F21V 8/00* | (2006.01) | |
| *B60Q 3/64* | (2017.01) | |
| *B60Q 3/80* | (2017.01) | |
| *F21V 23/06* | (2006.01) | |
| *G02B 6/42* | (2006.01) | |
| *F21Y 115/10* | (2016.01) | |
| *B60Q 3/74* | (2017.01) | |

(52) U.S. Cl.
CPC ............ *F21V 23/06* (2013.01); *F21V 2200/00* (2015.01); *F21Y 2115/10* (2016.08); *G02B 6/423* (2013.01); *G02B 6/4242* (2013.01)

(56) References Cited

U.S. PATENT DOCUMENTS

| | | |
|---|---|---|
| 2003/0081423 A1 | 5/2003 | Shinji et al. |
| 2008/0198607 A1 | 8/2008 | Goto et al. |
| 2009/0224645 A1 | 9/2009 | Ichikawa et al. |
| 2010/0080014 A1 | 4/2010 | Ichikawa |
| 2010/0210133 A1 | 8/2010 | Mochizuki |
| 2011/0194292 A1 | 8/2011 | Tsai |
| 2012/0025706 A1 | 2/2012 | Wang et al. |

FOREIGN PATENT DOCUMENTS

| | | |
|---|---|---|
| JP | H07-276739 A | 10/1995 |
| JP | H09-153689 A | 6/1997 |
| JP | H09-197189 A | 7/1997 |
| JP | 2005-019154 A | 1/2005 |
| JP | 2007-076020 A | 3/2007 |
| JP | 2008-049936 A | 3/2008 |
| JP | 2011-249730 A | 12/2011 |

\* cited by examiner

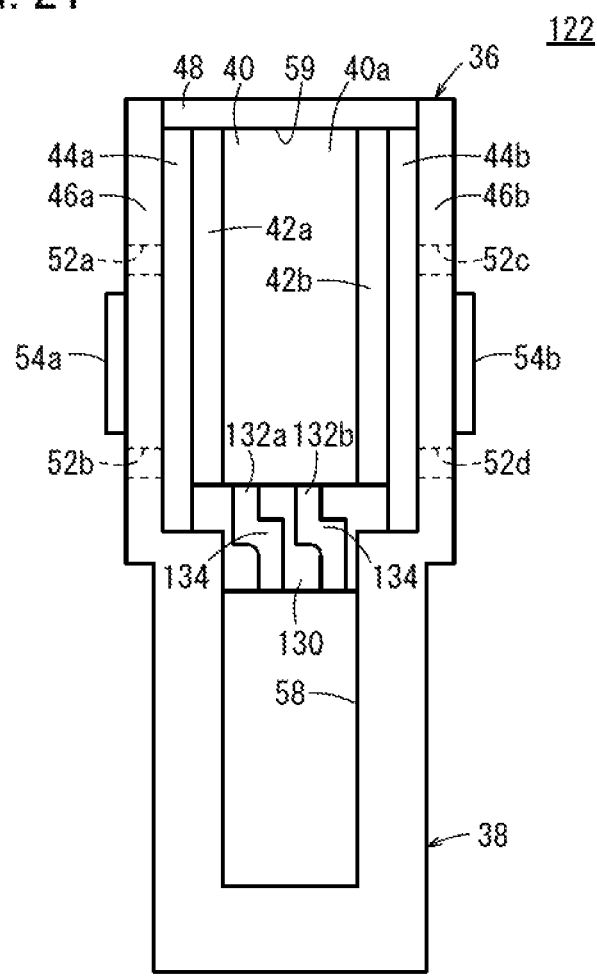

LIGHT-EMITTING DEVICE

CROSS-REFERENCE TO RELATED APPLICATIONS

The present application is a continuation of prior U.S. patent application Ser. No. 15/374,371, filed Dec. 9, 2016, which is a continuation of prior U.S. patent application Ser. No. 14/399,613, filed 7 Nov. 2014 as the US National Phase of International Application PCT/JP2012/061924 filed 9 May 2012, which is based on but does not claim priority under 35 USC 119 based on Japanese Patent Application Nos. 2010-233449 and 2010-233453, both filed 18 Oct. 2010. The entire disclosures of U.S. Ser. No. 14/399,613 and PCT/JP2012/0661924 are incorporated by reference herein.

TECHNICAL FIELD

The present invention relates to a light-emitting device having a board on which a light-emitting element is mounted.

BACKGROUND ART

Heretofore, light-emitting devices that are provided with a light-emitting diode (LED) have widely been used to illuminate the passenger compartments of vehicles.

There has been proposed a technical idea that, in a light-emitting device of the above type, a lens (light guide) for covering an LED is disposed on the mounting surface of a board on which the LED is mounted, and a case is mounted on a connector while pressing an upper surface of the lens toward the board, thereby sandwiching and holding the lens and the board (see, for example, Japanese Laid-Open Patent Publication No. 2010-083210).

According to the invention disclosed in Japanese Laid-Open Patent Publication No. 2010-083210, however, since the board and the lens are sandwiched and held using the case and the connector, it is necessary to make the lens relatively strong. Consequently, the lens itself becomes large in size, and accordingly the light-emitting device becomes large in size and weight as a whole.

Japanese Laid-Open Patent Publication No. 2009-239255, for example, proposes a light-emitting device wherein a board is held in position with stress acting on a light guide being reduced. The light-emitting device is provided with a case and a cover fitting into the case. A board with a bombshell-shaped LED lamp mounted thereon is disposed in a chamber that is defined between the case and the cover, which sandwich the board therebetween.

Specifically, the case has a pair of confronting side walls having respective holes defined therein. The cover that is held in abutment against one surface (mounting surface) of the board has teeth fitted in the holes of the side walls. The side walls are joined by a wall having a lower end surface. Under a condition that the lower end surface abuts against the other surface of the board, the teeth are fitted in the holes, whereby the board is held.

Japanese Laid-Open Patent Publication No. 2009-239255 also discloses a technical idea wherein a tubular portion for inserting therein a rod-shaped light guide body (light guide) for guiding light emitted from the LED lamp is disposed in the case and the tubular portion has on an inner surface thereof a protrusion for positioning the light guide body, thereby keeping the distance between the light guide body and the LED lamp constant.

SUMMARY OF INVENTION

However, there is nothing disclosed in Japanese Laid-Open Patent Publication No. 2009-239255 as to how the light guide body is positioned by the protrusion. If the end face of the light guide body that faces the LED lamp is held in abutment against the protrusion, thereby positioning the light guide body vertically inside the tubular portion, then the light guide body tends to move with respect to the tubular portion by gravity, consequently increasing the distance between the light-emitting element and the light guide body or displacing the light guide body from the tubular portion.

The present invention has been made in view of the above problems. It is an object of the present invention to provide a light-emitting device which is capable of keeping the distance between a light-emitting element and a light guide constant regardless of the orientation of the light-emitting device and which is reduced in size and weight.

According to the present invention, there is provided a light-emitting device including a board holding an end of a connection terminal and on which an electronic component is mounted, a light-emitting element mounted on a surface of the board, a support member on which the board is placed, and a cover positioning and holding the board by being mounted in the support member while in abutment against the surface of the board.

The cover has a main cover body covering the surface of the board, and a light guide for passing therethrough light emitted from the light-emitting element is disposed on the main cover body while being prevented from moving along a direction to sandwich the board (first feature).

Preferably, the cover has a pair of protrusions positioned such that the light-emitting element is interposed between the protrusions, and the protrusions being integrally formed with the main cover body, the protrusions include ridges abutting against the surface of the board, and first engaging portions, and the support member has a chamber defined therein for accommodating the board and the cover, and also has second engaging portions for engaging with the first engaging portions, and the first engaging portions engage with the second engaging portions to thereby position and hold the board with the cover (second feature).

Preferably, the support member is integrally formed of a resin material, and the cover is integrally formed of a resin material (third feature).

Preferably, the first engaging portions are mounting teeth having tapered surfaces formed thereon, and the second engaging portions are mounting holes in which the first engaging portions are fitted (fourth feature).

Preferably, the chamber is defined in the support member by a wall, the wall including a bottom surface and a pair of steps rising from the bottom surface, and the board has another surface spaced from the bottom surface and placed on upper surfaces of the steps (fifth feature).

Preferably, the connection terminal includes an adhered section connected to the board, and a lead section contiguous to the adhered section and extending parallel to the surface of the board, and the cover has a terminal holder holding the lead section (sixth feature).

Preferably, the electronic component is electrically connected to the light-emitting element and mounted on only the surface of the board (seventh feature).

Preferably, the light guide is a lens for diverging or converting light emitted from the light-emitting element, the lens being integrally formed with the cover body in confronting relation to the light-emitting element (eighth feature).

Preferably, the light guide is a light guide body for guiding light emitted from the light-emitting element, the main cover body has a tubular portion in which the light guide is mounted, and the tubular portion has, on an inner surface thereof, a first stopper for abutting against the light guide to thereby prevent the light guide from moving in a direction toward the board, and a second stopper for abutting against the light guide that is held in abutment against the first stopper, to thereby prevent the light guide from moving in a direction away from the board (ninth feature).

Preferably, the tubular portion is integrally formed of a resin material (tenth feature).

Preferably, the light guide has a main light guide body, and a convexity for abutting against the second stopper, the convexity being integrally formed with an outer surface of the main light guide body, the convexity being held in abutment against the second stopper to thereby prevent the light guide from moving in a direction away from the board (eleventh feature).

Preferably, at least one of the second stopper and the convexity has a tapered surface formed thereon (twelfth feature).

Preferably, a rotation limiter is formed on contacting surfaces of the tubular portion and the main light guide body (thirteenth feature).

Preferably, the first stopper includes two first stoppers disposed in confronting relation to each other, and the second stopper includes two second stoppers disposed in confronting relation to each other (fourteenth feature).

Preferably, a curved section is disposed between the adhered section and the lead section (fifteenth feature).

Preferably, at least either of the first engaging portions or the second engaging portions are disposed so as to interpose the light guide therebetween (sixteenth feature).

Preferably, the lead section includes a bent portion, the support member has a bent groove portion of a shape corresponding to a shape of the bent portion, and the bent portion is disposed for abutment against a groove side surface of the bent groove portion (seventeenth feature).

According to the first feature of the invention, the board is positioned and held by the cover that is mounted on the support member while being held in abutment against the surface of the board. Since the board is held in position with reduced stresses acting on the light guide, the light-emitting device can be reduced in size and weight. Inasmuch as the light guide is disposed on the main cover body while being prevented from moving in a direction to sandwich the board, the distance between the light-emitting element and the light guide is kept constant regardless of the orientation of the light-emitting device.

According to the second feature of the invention, the first engaging portions disposed respectively on the protrusions integrally formed with the main cover body engage with the second engaging portions on the support member thereby to hold the board with the cover. Therefore, the board can be held stably with respect to the support member. Thus, the light-emitting device as a whole can effectively be reduced in size and weight.

The protrusions have the respective ridges held in abutment against the surface of the board. Therefore, even when a plurality of light-emitting devices are manufactured, the distance between the light-emitting element and the light guide is kept constant. As a result, the light-emitting device is prevented from having quality variations.

According to the third feature of the invention, since both the support member and the cover are made of a resin material, when the cover is fitted in the support member, the cover is resiliently held in position flexibly.

According to the fourth feature of the invention, the first engaging portions are the mounting teeth having the tapered surfaces, and the second engaging portions are the mounting holes, so that the cover can easily be inserted into the support member.

According to the fifth feature of the invention, when the other surface of the board abuts against the upper surfaces of the steps, a gap is formed between the board and the bottom surface. Owing thereto, heat generated by the light-emitting element, etc. is dissipated into the gap, so that any increase in the temperature of the light-emitting element, etc. can be made smaller than if the entire other surface of the board is held in contact with the bottom surface.

According to the sixth feature of the invention, since the lead section of the connection terminal is held by the terminal holder of the cover while the adhered section of the connection terminal is connected to the board, the board is held in position more stably.

According to the seventh feature of the invention, as the electronic component is mounted on only the surface of the board (the surface on which the light-emitting element is mounted), the light-emitting device can suitably be made smaller in size and weight as a whole than if the electronic component is mounted on the other surface of the board.

According to the eighth feature of the invention, as the light guide is the lens, the degree of divergence or convergence of light (light distribution characteristics) that has passed through the lens is prevented from varying. Furthermore, as the light guide is integrally formed with the main cover body, the number of parts used can be reduced, and the distance between the light guide and the light-emitting element can be kept constant.

According to the ninth feature of the invention, since the light guide which is the light guide body for guiding light emitted from the light-emitting element is held in abutment against the first stopper of the tubular portion to prevent the light guide from moving toward the board, the light guide can be positioned in the tubular portion. Moreover, since the light guide is held in abutment against the second stopper while being held in abutment against the first stopper, thereby preventing the light guide from moving in the direction away from the board, the light guide is not displaced in position with respect to the tubular portion even if, for example, the light-emitting device is oriented such that the opening of the tubular portion remote from the board is oriented vertically downwardly. The distance between the light-emitting element and the light guide can thus be kept constant regardless of the orientation of the light-emitting device.

According to the ninth feature of the invention, since the light guide is positioned and held by the first stopper and the second stopper on the inner surface of the tubular portion, it is not necessary to form holes in the wall of the tubular portion for holding the light guide. Consequently, light emitted from the light-emitting element is free from the problem of leaking out through such holes. Accordingly, the quality of the light-emitting device can be increased without involving an increase in the number of parts used.

According to the tenth feature of the invention, as the tubular portion is made of a resin material, when the light guide is inserted into the tubular portion, the tubular portion is bent radially outwardly. Therefore, the light guide can easily be inserted into the tubular portion.

According to the eleventh feature of the invention, inasmuch as the convexity for abutting against the second stopper is integrally formed with the outer surface of the main light guide body, when the light guide is inserted into the tubular portion, the convexity is pressed against the second stopper, whereby the tubular portion is bent radially outwardly. The light guide can thus more easily be inserted into the tubular portion.

According to the twelfth feature of the invention, because at least one of the second stopper and the convexity has the tapered surface formed thereon, the light guide can more easily be inserted into the tubular portion.

According to the thirteenth feature of the invention, as the rotation limiter is formed on the contacting surfaces of the tubular portion and the main light guide body, the light guide inserted in the tubular portion is suitably prevented from rotating in circumferential directions of the tubular portion.

According to the fourteenth feature of the invention, the paired first stoppers are disposed in confronting relation to each other, and the paired second stoppers are disposed in confronting relation to each other. Therefore, the light guide can be positioned and held in the tubular portion in a more well-balanced fashion than if one first stopper and one second stopper are provided. Since the paired first stoppers are disposed in confronting relation to each other, when the tubular portion (cover) is to be formed by injection molding, a core disposed in the tubular portion may be made up of separate members of suitable size for easy removal of the core from the tubular portion.

According to the fifteenth feature of the invention, as the curved section is disposed between the adhered section and the lead section, a shock acting on the adhered section can appropriately be reduced by the curved section even if, for example, a connector for supplying electric power is connected to the lead section.

According to the sixteenth feature of the invention, the plural first engaging portions or the plural second engaging portions are disposed so as to interpose the light guide therebetween. Consequently, the light guide is appropriately prevented from being displaced in position with respect to the support member. In other words, the supporting rigidity for the light guide can be increased.

According to the seventeenth feature of the invention, the bent portion is capable of abutting against the groove surface which defines the bent groove portion. Therefore, the groove side surface acts as a load receiving portion when a connector for supplying electric power is connected to the lead section. Therefore, the adhered section can appropriately be prevented from being damaged.

BRIEF DESCRIPTION OF DRAWINGS

FIG. 21 is a plan view of a case of the light-emitting device shown in FIG. 20.

DESCRIPTION OF EMBODIMENTS

Light-emitting devices according to preferred embodiments of the present invention will be described in detail below with reference to the accompanying drawings.

Figure 1:
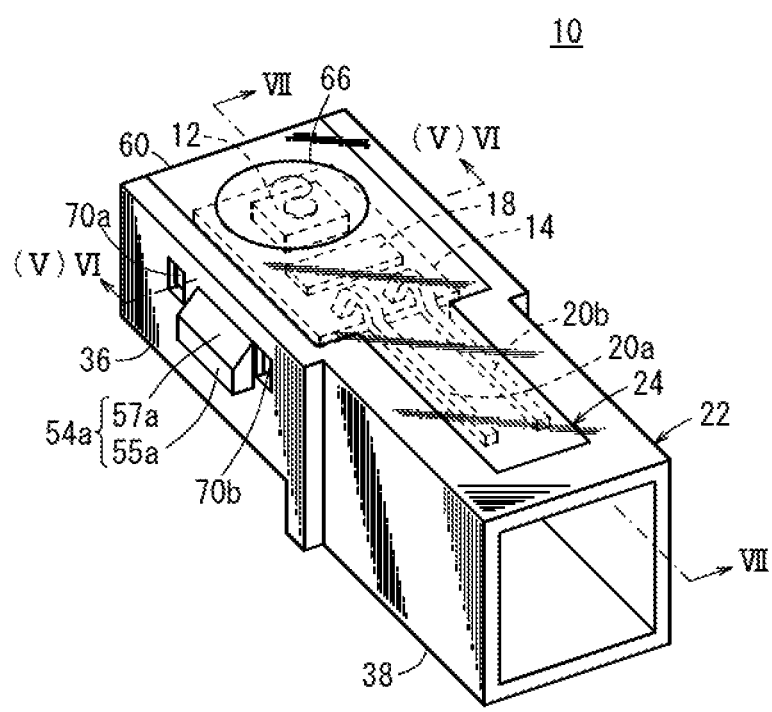
FIG. 1 is a perspective view of a light-emitting device according to an embodiment of the present invention.
Figure 2:
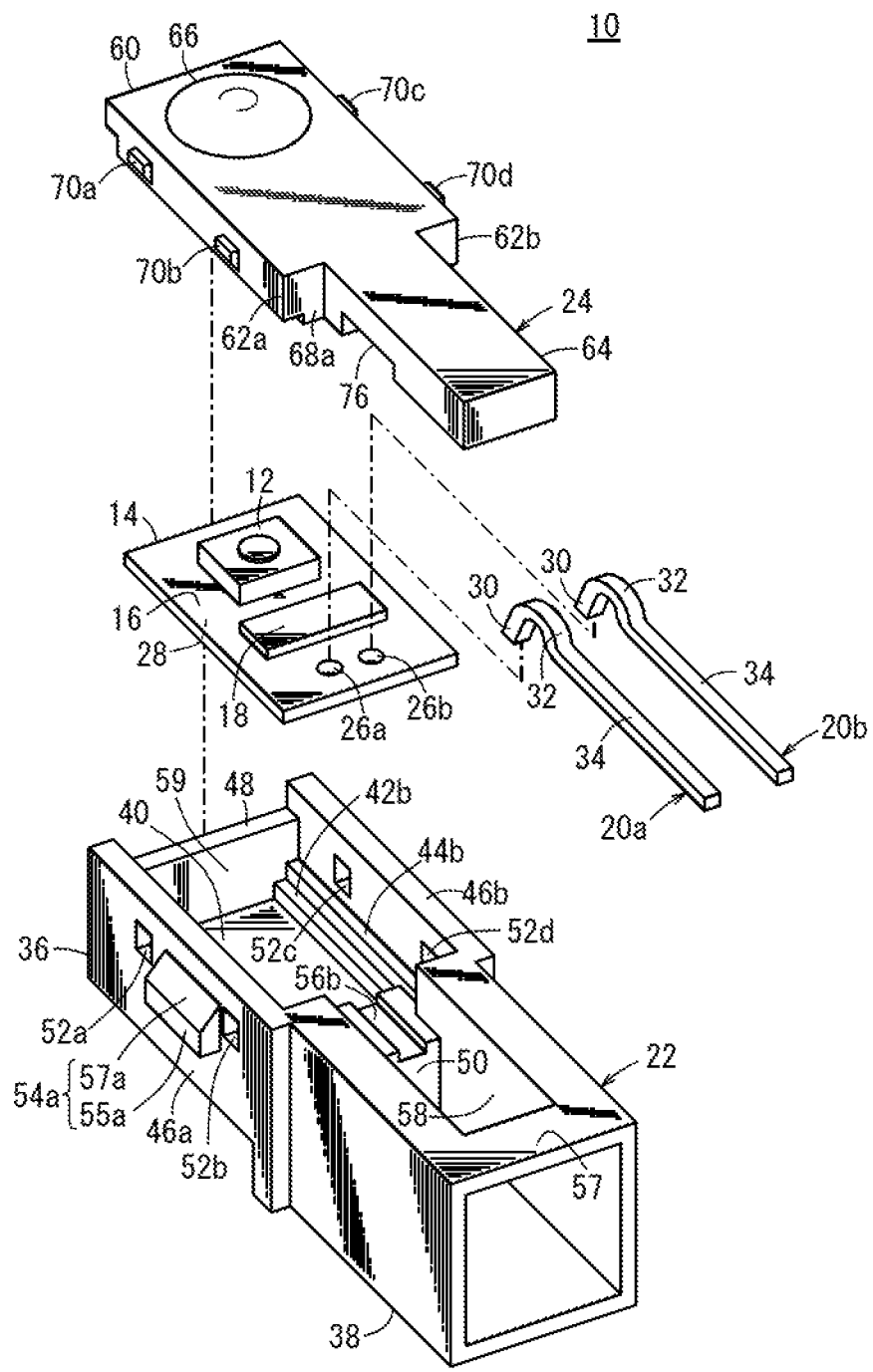
FIG. 2 is an exploded perspective view of the light-emitting device shown in FIG. 1.

A light-emitting device 10 according to an embodiment of the present invention is used to illuminate the passenger compartment of a vehicle. As shown in FIGS. 1 and 2, the light-emitting device 10 includes a light-emitting element 12 as a light source, a board 14 having a rectangular shape in planar view with the light-emitting element 12 mounted thereon, an electronic component 18 mounted on a surface (hereinafter also referred to as "mounting surface") 16 of the board 14 on which the light-emitting element 12 is mounted, the electronic component 18 being electrically connected to the light-emitting element 12, a pair of connection terminals (terminals) 20a, 20b connected to the board 14, a case (support member) 22 housing the board 14, etc. therein, and a cover 24 mounted on the case 22.

The light-emitting element 12 comprises an LED, for example, but may comprise an organic EL device or the like. The LED and the organic EL device may be of known technology. The light-emitting element 12 is located off the longitudinal center of the board 14 toward one end thereof.

The electronic component 18, which serves to control the supply of electric power to the light-emitting element 12, etc., comprises a resistor, a diode, or the like, for example. The electronic component 18 is positioned substantially at the transverse center of the board 14, and located off the longitudinal center of the board 14 toward the other end thereof.

The board 14 has a pair of through holes 26a, 26b defined therein closer to the other end thereof than the electronic component 18 along the longitudinal directions of the board 14. The connection terminals 20a, 20b have ends inserted respectively in the through holes 26a, 26b, which may be spaced from each other by a desired distance. However, the distance between the through holes 26a, 26b should preferably be large enough to keep the connection terminals 20a, 20b out of contact with each other when the connection terminals 20a, 20b are inserted in the through holes 26a, 26b and secured in place. A conductor in a planar form, e.g., in the form of a foil, is disposed on a reverse side 28 of the board 14. The light-emitting element 12, the electronic component 18, and the connection terminals 20a, 20b are electrically connected to each other by the conductor to thereby produce a heat radiating effect.

Figure 7:
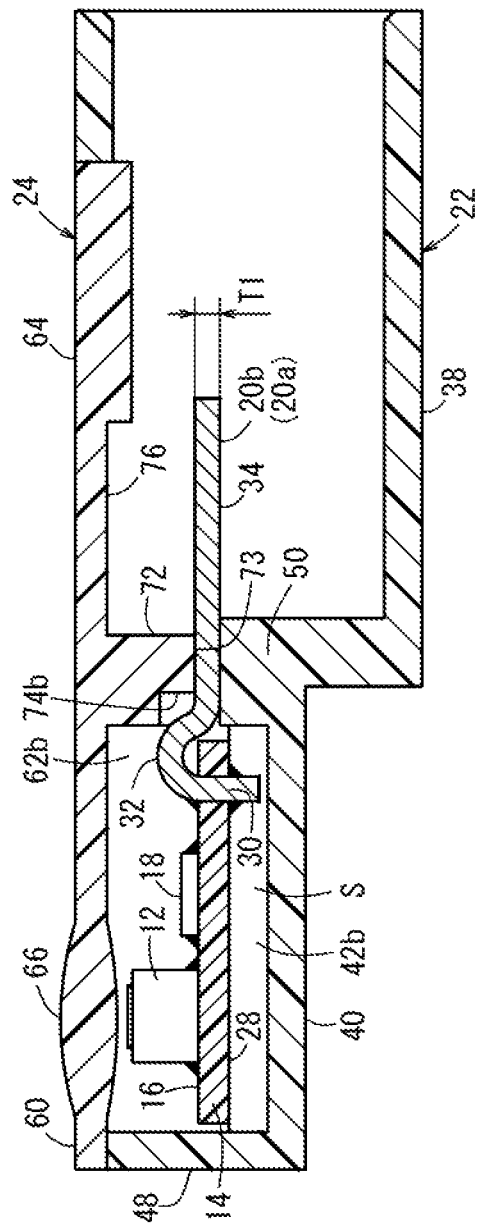
FIG. 7 is a cross-sectional view taken along line VII-VII of FIG. 1.

As can be seen from FIGS. 2 and 7, the connection terminal 20a has opposite end faces formed flatwise. However, the opposite ends of the connection terminal 20a are not limited to any shape, but may be of a tapered shape, for example. The tapered opposite ends of the connection terminal 20a allow one end of the connection terminal 20a to be inserted easily into the through hole 26a, and allows the other end thereof to be mounted on an external connector for supplying electric power, to be described later.

The connection terminal 20a is in the form of a slender metal rod (metal plate) having a rectangular cross-sectional shape. The connection terminal 20a has an adhered section (attached section) 30 (see FIG. 7), which is soldered to the board 14 while being inserted into the through hole 26a of the board 14, an arcuately curved section 32 contiguous to the adhered section 30, and a lead section 34 contiguous to the curved section 32 and extending toward the other end of the connection terminal 20a.

The connection terminal 20a has a wall thickness T1 (see FIG. 7) set to such a thickness as to make the curved section 32 flexible. Owing thereto, the curved section 32 can be bent to adjust the positional relationship between the adhered section 30 and the lead section 34. The lead section 34 is connected to the external connector for supplying electric power, not shown, so that the light-emitting element 12 can be supplied with electric power from outside. The connection terminal 20b, which is inserted in the through hole 26b, is identical in structure to the connection terminal 20a, and hence will not be described in detail below.

Figure 3:
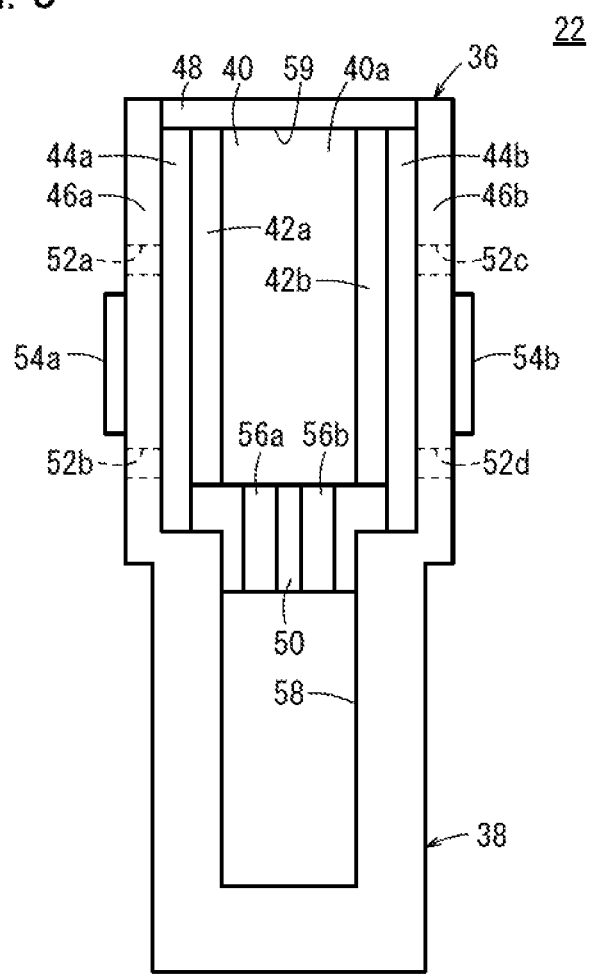
FIG. 3 is a plan view of a case of the light-emitting device shown in FIG. 2.

As shown in FIG. 3, the case 22 has a case body 36 which is wide and extends in one direction with the board 14 housed therein, and a connector 38 which is narrow and is connected to the case body 36. The case body 36 and the connector 38 are integrally made of a resin or the like.

Figure 5:
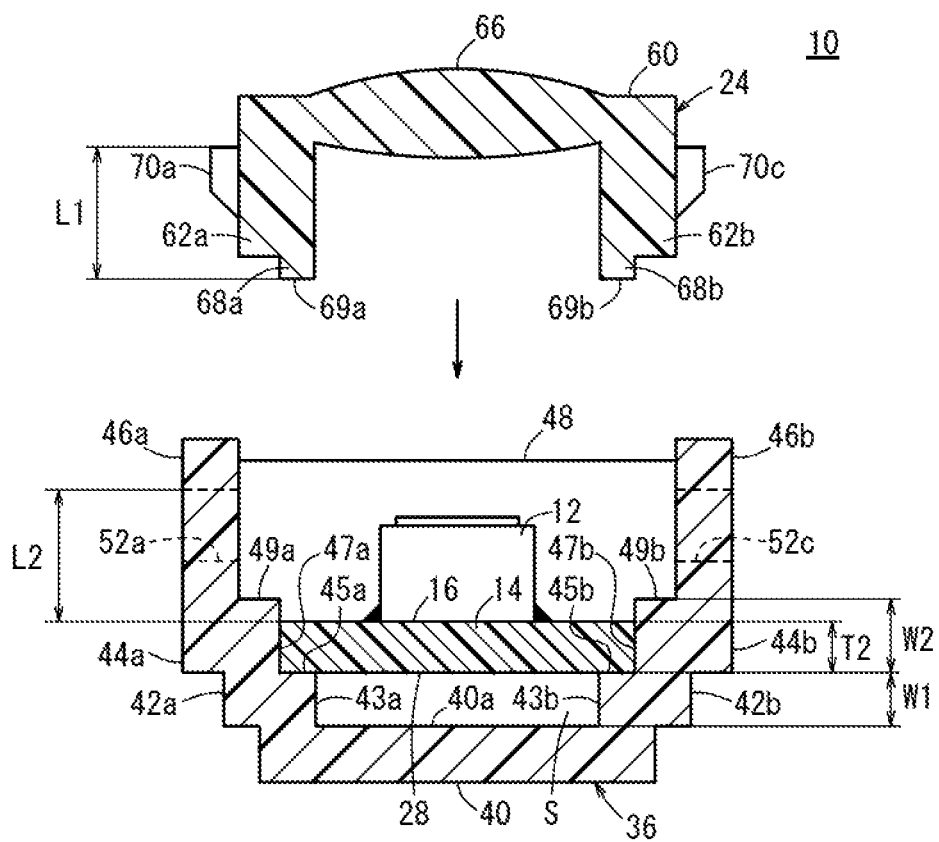
FIG. 5 is a cross-sectional view taken along line V-V of FIG. 1 before the cover is mounted in place.

As shown in FIG. 5, the case body 36 has a bottom 40 which is of a substantially rectangular shape as viewed in plan, a pair of first steps 42a, 42b disposed on transversely opposite ends of the bottom 40, a pair of second steps 44a, 44b contiguous respectively to the first steps 42a, 42b, a pair of side walls 46a, 46b contiguous respectively to the second steps 44a, 44b, a wall 48 disposed vertically on the bottom 40 and extending to positions near the upper ends of the side walls 46a, 46b, and a thick wall 50 (see FIG. 2) disposed vertically on the bottom 40 in confronting relation to the wall 48.

The first steps 42a, 42b extend along the side walls 46a, 46b and have ends held against the wall 48 and the other ends held against the wall 50. The first steps 42a, 42b have respective first vertical surfaces 43a, 43b contiguous to an inner surface (a surface confronting the board 14, a bottom surface) 40a of the bottom 40, and first upper surfaces 45a, 45b contiguous respectively to the first vertical surfaces 43a, 43b.

The width W1 of the first vertical surfaces 43a, 43b (the height of the first steps 42a, 42b) is about the same as the thickness T2 of the board 14. When the board 14 is placed on the first upper surfaces 45a, 45b, an appropriate gap S is defined between the board 14 and the bottom 40. Heat generated by the light-emitting element 12 and the electronic component 18 is dissipated into the gap S, so that increase in the temperature of the light-emitting element 12 and the electronic component 18 can be made smaller than if the entire reverse side 28 of the board 14 is held in contact with the bottom 40.

The second steps 44a, 44b extend along the side walls 46a, 46b and have ends held against the wall 48 and the other ends held against the connector 38. The second steps 44a, 44b have respective second vertical surfaces 47a, 47b contiguous respectively to the first upper surfaces 45a, 45b, and second upper surfaces 49a, 49b contiguous respectively to the second vertical surfaces 47a, 47b. The width W2 of the second vertical surfaces 47a, 47b (the height of the second steps 44a, 44b) is greater than the thickness T2 of the board 14. When the board 14 is placed on the first upper surfaces 45a, 45b, the second upper surfaces 49a, 49b are positioned above the mounting surface 16 of the board 14.

The distance between the second vertical surfaces 47a, 47b is essentially the same as the transverse width of the board 14, thereby limiting transverse movement of the board 14.

As shown in FIG. 2, the side wall 46a has a plurality of (two in FIG. 2) mounting holes (second engaging portions) 52a, 52b that are spaced from each other by a predetermined distance, and the side wall 46b similarly has mounting holes (second engaging portions) 52c, 52d. The mounting holes 52a, 52b and the mounting holes 52c, 52d are in the form of quadrangle-shaped openings complementary in shape respectively to mounting teeth (first engaging portions) 70a, 70b and mounting teeth (first engaging portions) 70c, 70d of the cover 24, to be described later.

The mounting holes 52a, 52b and the mounting holes 52c, 52d are positioned slightly above the centers of the side walls 46a, 46b. Therefore, when the cover 24 is installed in the case 22, the side walls 46a, 46b are elastically deformed outwardly by the mounting teeth 70a, 70b and the mounting teeth 70c, 70d to a smaller extent than if the mounting holes 52a, 52b and the mounting holes 52c, 52d are positioned below the centers of the side walls 46a, 46b. Consequently, the cover 24 can be installed in the case 22 with a smaller force.

The mounting holes 52a, 52b in the side wall 46a are positioned along the longitudinal directions of the case 22 such that the distance between an end of the side wall 46a and the mounting hole 52a, the distance between the mounting hole 52a and the mounting hole 52b, and the distance between the mounting hole 52b and the other end of the side wall 46a are equal to each other. The mounting hole 52c in the side wall 46b faces the mounting hole 52a, whereas the mounting hole 52d in the side wall 46b faces the mounting hole 52b. Consequently, the case 22 can hold the cover 24 in a more well-balanced fashion than if the mounting holes 52a, 52b and the mounting holes 52c, 52d are staggered along the longitudinal directions of the case 22.

The side walls 46a, 46b have on their outer surfaces respective fixing fingers 54a, 54b positioned respectively between the mounting holes 52a, 52b and between the mounting holes 52c, 52d for engaging with retaining portions 200a, 200b, to be described later, on a vehicle body panel P (see FIG. 8). The fixing fingers 54a, 54b extend along the longitudinal directions of the case 22, and include respective tapered portions 57a, 57b that are integrally formed with bases 55a, 55b formed substantially in the shape of a rectangular parallelepiped. Each of the tapered portions 57a, 57b is slanted downwardly and outwardly from an upper end thereof.

The walls 48, 50 have such a height that the case 22 and the cover 24 lie flush with each other when the cover 24 is mounted on the case 22 (see FIGS. 1 and 7).

The wall 50 is substantially of a T shape as viewed in plan and has a length extending into the interior of the connector 38. The wall 50 has a pair of placement grooves 56a, 56b defined substantially centrally in an upper surface thereof and extending in longitudinal directions (see FIG. 3). The placement grooves 56a, 56b have a width that is substantially the same as the width of the lead sections 34 of the connection terminals 20a, 20b, and a depth that is substantially the same as the thickness T1 of the lead sections 34 (see FIG. 7).

As shown in FIG. 1, the connector 38 is in the form of a hollow quadrangular prism housing the lead sections 34 of the connection terminals 20a, 20b therein. An external connector for supplying electric power, not shown, can be inserted into the hollow body of the connector 38. According to the present embodiment, the connector 38 has a vertical thickness greater than the case body 36. The connector 38 has a rectangular cutout 58 defined in a wall 57 thereof and having a width corresponding to the width of a cover extension 64 to be described later.

With the case 22 thus constructed, a space surrounded by the bottom 40, the first steps 42a, 42b, the second steps 44a, 44b, the side walls 46a, 46b, the wall 48, and the wall 50, and the cutout 58 in the connector 38 jointly make up a space (chamber) 59 in which the cover 24 can be mounted.

Figure 4:
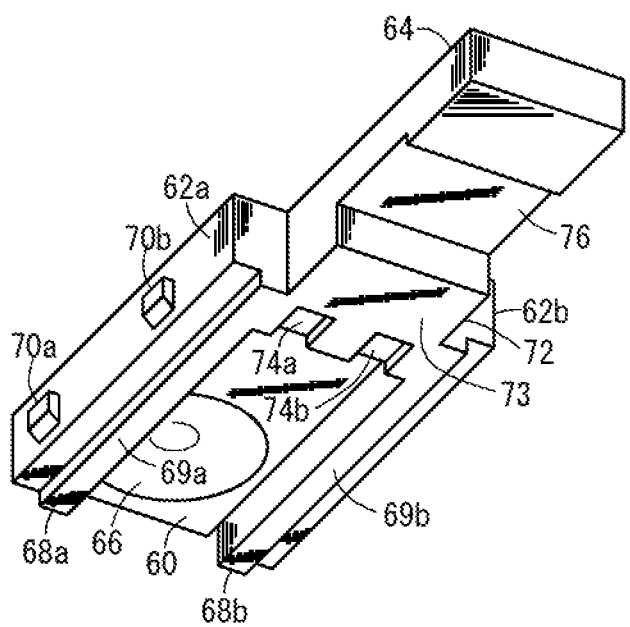
FIG. 4 is a perspective view of a cover of the light-emitting device shown in FIG. 2, as viewed from behind.

As shown in FIGS. 2 and 4, the cover 24 is integrally formed of resin or the like, and has a main cover body 60 which is of substantially rectangular shape as viewed in plan, a pair of protrusions 62a, 62b projecting downwardly from transverse opposite ends of the main cover body 60 along longitudinal directions, and a cover extension 64 having a reduced width and extending from an end (other end) of the main cover body 60.

The main cover body 60 has a lens (light guide) 66 on an end thereof for diverging or converging light emitted from the light-emitting element 12. According to the present embodiment, the lens 66 is constructed as a double-convex lens. However, the lens 66 may be of an appropriately selected type and shape. The lens 66 is of a circular shape (truly circular shape) as viewed in plan.

As shown in FIG. 2, the lens 66 is positioned between the mounting teeth 70a, 70c to be described later. Specifically, when the light-emitting device 10 is assembled, the lens 66 is positioned between the mounting holes 52a, 52c in the widthwise directions of the cover 24.

Since the mounting teeth 70a, 70c are positioned near the lens 66, any positional displacement of the lens 66 with respect to the case 22 is suitably suppressed, thereby making it possible to support the lens 66 stably.

The distance by which the protrusions 62a, 62b project is determined depending on the height of the side walls 46a, 46b.

The protrusions 62a, 62b have respective ridges 68a, 68b (see FIG. 4). The ridges 68a, 68b are of the same length as the protrusions 62a, 62b, and the distance by which the ridges 68a, 68b project is about the same as the difference (W2−T2) between the width W2 of the second vertical surfaces 47a, 47b and the thickness T2 of the board 14 (see FIG. 5).

The protrusions 62a, 62b have on their outer side surfaces the mounting teeth 70a, 70b and the mounting teeth 70c, 70d that are spaced from each other. The mounting teeth 70a, 70b, 70c, 70d can be fitted respectively in the mounting holes 52a, 52b, 52c, 52d. The distance by which the mounting teeth 70a, 70b and the mounting teeth 70c, 70d are spaced from each other is identical to the distance by which the mounting holes 52a, 52b and the mounting holes 52c, 52d are spaced from each other. The mounting teeth 70a, 70b, 70c, 70d are substantially in the shape of a rectangular parallelepiped, and have lower end portions progressively tapered downwardly.

According to the present embodiment, as shown in FIG. 5, the distance L1 from lower end faces 69a, 69b of the ridges 68a, 68b to upper end faces of the mounting teeth 70a, 70b and the mounting teeth 70c, 70d is slightly greater than the distance L2 from the mounting surface 16 of the board 14 to upper ends of the mounting holes 52a, 52b and the mounting holes 52c, 52d when the board 14 is placed on the first upper surfaces 45a, 45b of the case body 36. The reasons for this will be described later.

A terminal holder 72 which projects downwardly is disposed on the boundary between the main cover body 60 and the cover extension 64 (see FIG. 4). The terminal holder 72 has a lower end face 73 that is integrally joined to the lower end faces 69a, 69b of the ridges 68a, 68b, thereby making up a flat surface.

The lower end face 73 of the terminal holder 72 has a pair of recesses 74a, 74b defined therein that are spaced from each other along the transverse directions of the main cover body 60 by a predetermined distance which corresponds to the distance by which the placement grooves 56a, 56b in the wall 50 are spaced from each other.

A groove 76 for holding the external connector for supplying electric power therein is defined in a lower surface of the cover extension 64 in a region adjacent to the terminal holder 72.

A procedure for assembling the light-emitting device 10 according to the present embodiment will be described below. First, the light-emitting element 12 and the electronic component 18 are installed on the surface 16 of the board 14. The adhered sections 30 of the connection terminals 20a, 20b are inserted into the respective through holes 26a, 26b in the board 14, and soldered to the board 14.

Thereafter, the board 14 with the light-emitting element 12, etc. installed thereon is introduced into the case 22. At this time, as shown in FIG. 5, the reverse side 28 of the board 14 is brought into contact with the first upper surfaces 45a, 45b, and side surfaces of the board 14 are brought into contact with the second vertical surfaces 47a, 47b, with the lead sections 34 of the connection terminals 20a, 20b being accommodated in the respective placement grooves 56a, 56b in the wall 50. The board 14 and the connection terminals 20a, 20b are thus positioned in the case 22.

Then, the cover 24 is mounted in the case 22. Specifically, when the cover 24 approaches the case 22, tip ends of the protrusions 62a, 62b of the cover 24 enter the case body 36 while outer surfaces of the protrusions 62a, 62b are in contact with inner surfaces of the side walls 46a, 46b of the case body 36, until the mounting teeth 70a, 70b and the mounting teeth 70c, 70d contact the side walls 46a, 46b.

When the cover 24 is pressed toward the bottom 40 of the case body 36, the side walls 46a, 46b are elastically deformed in directions away from each other, and by reaction forces from the side walls 46a, 46b, the protrusions 62a, 62b are elastically deformed in directions toward each other. In the above state, the protrusions 62a, 62b move further into the case body 36.

Thereafter, the lower end faces 69a, 69b of the ridges 68a, 68b are brought into contact with the mounting surface 16 of the board 14, and lower end faces of the protrusions 62a, 62b are brought into contact with the second upper surfaces 49a, 49b. As described above, since the distance L1 from the lower end faces 69a, 69b to the upper end faces of the mounting teeth 70a, 70b and the mounting teeth 70c, 70d is greater than the distance L2 from the mounting surface 16 of the board 14 to the upper ends of the mounting holes 52a, 52b, 52c, 52d, the mounting teeth 70a, 70b, 70c, 70d in this state are not yet fitted in the mounting holes 52a, 52b, 52c, 52d.

Figure 6:
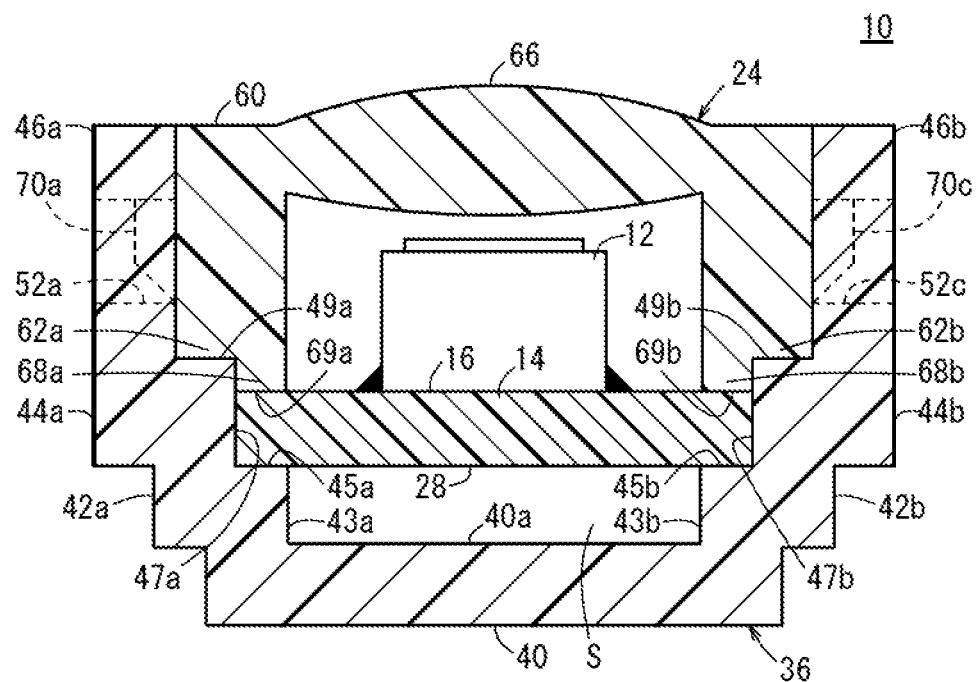
FIG. 6 is a cross-sectional view taken along line VI-VI of FIG. 1.

When the cover 24 is further pressed toward the bottom 40, the case body 36 and the cover 24 are slightly deformed, allowing the cover 24 to move further into the case body 36 until the mounting teeth 70a, 70b, 70c, 70d are fitted in the mounting holes 52a, 52b, 52c, 52d (see FIG. 6). At this time, the protrusions 62a, 62b and the side walls 46a, 46b that have been elastically deformed return to their respective original shapes. As a result, the cover 24 is mounted in the case 22 while the lower end faces 69a, 69b of the ridges 68a, 68b are pressing (abutting against) the mounting surface 16 of the board 14. The lower end face 73 of the terminal holder 72 is now held in abutment against the lead sections 34 of the connection terminals 20a, 20b (see FIG. 7).

Figure 8:
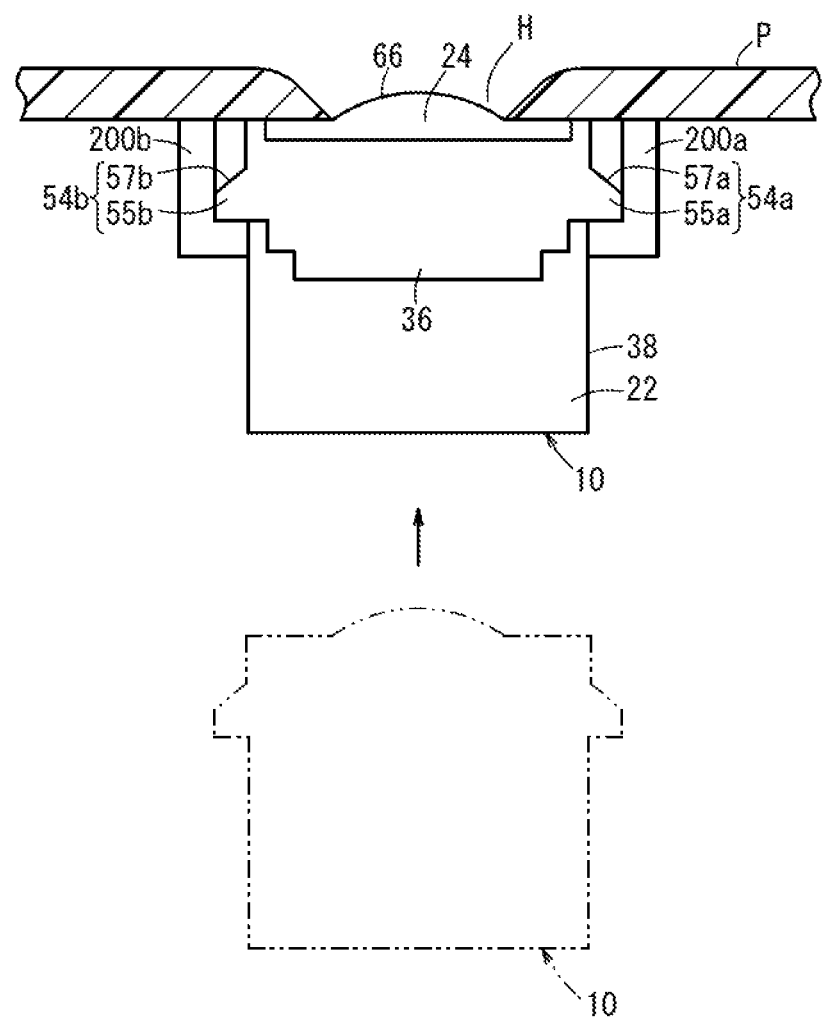
FIG. 8 is a plan view, partly in cross section, of the light-emitting device shown in FIG. 1 which is disposed on a vehicle body panel.

As shown in FIG. 8, the light-emitting device 10 thus assembled is disposed in a predetermined position on the vehicle body panel P of a vehicle, not shown. Specifically, the light-emitting device 10 is set on the side of the reverse side of the vehicle body panel P such that the lens 66 faces a window H defined in the vehicle body panel P, and the light-emitting device 10 is moved toward the vehicle body panel P. The resin-made retaining portions 200a, 200b, which are formed on the reverse side of the vehicle body panel P, are brought into contact with the tapered portions 57a, 57b of the fixing fingers 54a, 54b of the light-emitting device 10.

When the light-emitting device 10 is further pressed toward the vehicle body panel P, the light-emitting device 10 moves toward the vehicle body panel P while the retaining portions 200a, 200b are being elastically deformed in directions away from each other, until the lens 66 is fitted into the window H. At this time, the retaining portions 200a, 200b which have been elastically deformed return to their respective original shapes. As a consequence, the light-emitting device 10 is gripped by the vehicle body panel P and the retaining portions 200a, 200b, whereby the light-emitting device 10 is securely fixed to the vehicle body panel P.

According to the present embodiment, the cover 24 is mounted in the case 22 while being held in abutment against the surface 16 of the board 14, whereby the board 14 is positioned and held. Owing thereto, the board 14 is held in position with reduced stresses acting on the lens 66, and thus the light-emitting device 10 can be reduced in size and weight. Inasmuch as the lens 66 is disposed on the main cover body 60 while being prevented from moving in a direction to sandwich the board 14, the distance between the light-emitting element 12 and the lens 66 is kept constant regardless of the orientation of the light-emitting device 10.

The LED device disclosed in Japanese Laid-Open Patent Publication No. 2009-239255 is designed to eliminate failures due to external forces applied when it is installed on an external connector, and to reduce its size. The disclosed LED device has a case and a cover fitting into the cover. The LED device has a printed-circuit board supporting a bombshell-shaped LED lamp as a light source thereon, and connection terminals held by the printed-circuit board and the case. The LED device is fixed to an external device by fixing members inserted through mounting holes defined in the case.

The case has a pair of confronting side walls having respective holes defined therein. The cover, which is held in abutment against one surface of the printed-circuit board, has teeth for being fitted in the holes of the side walls. The side walls are interconnected by a wall having a lower end face. In a state where the lower end face abuts against the other surface of the printed-circuit board, the teeth are fitted into the holes, whereby the printed-circuit board is held. The case has a tubular portion for optical fiber, the tubular portion being inserted toward the LED lamp.

However, the LED device disclosed in Japanese Laid-Open Patent Publication No. 2009-239255 is disadvantageous in that it cannot be reduced in size as desired because the bombshell-shaped LED lamp is used and the case has the mounting holes. Further, since only the lower end face of the wall that interconnects the side walls having the holes is held in abutment against the printed-circuit board, when a plurality of LED devices are manufactured, the distance between the LED lamp and an opening of the tubular portion that faces the printed-circuit board tends to vary. As a result, as the amount of light guided into the optical fiber cannot be kept constant, the LED devices are likely to have quality variations.

According to the invention disclosed in Japanese Laid-Open Patent Publication No. 2010-083210, since a board and a lens are gripped in position using two parts, i.e., a case and a connector, the light-emitting device is liable to have a large overall size and an increased weight disadvantageously.

With the light-emitting device 10 according to the present embodiment, in a structure wherein light emitted from the light-emitting element 12 passes through the lens 66, the lens 66 and the board 14 can be held stably in place with a smaller number of parts than conventional techniques. Therefore, the light-emitting device 10 can be reduced in size and weight. Even when a plurality of light-emitting devices 10 are manufactured, they are prevented from varying in quality.

Specifically, with the light-emitting device 10 according to the present embodiment, inasmuch as the lower end faces 69a, 69b of the ridges 68a, 68b of the cover 24 are pressed (abut) against the mounting surface 16 of the board 14 while the reverse side 28 of the board 14 is held in abutment against the first upper surfaces 45a, 45b of the case body 36, the board 14 is reliably held in the case 22. At this time, the mounting teeth 70a, 70b, 70c, 70d of the cover 24 are fitted in the mounting holes 52a, 52b, 52c, 52d in the case body 36, the cover 24 is held with respect to the case 22.

According to the present embodiment, since the lens 66 is formed on the main cover body 60 of the cover 24, there is no need for parts for holding the lens 66 on the case 22. Therefore, the lens 66 and the board 14 are held in the case 22 with a smaller number of parts than conventional techniques. The light-emitting device 10 as a whole can effectively be reduced in size and weight.

According to the present embodiment, the board 14 is pressed by the ridges 68a, 68b of the cover 24 with the light-emitting element 12 being disposed between the ridges 68a, 68b, and the protrusions 62a, 62b are integral with the lens 66. Consequently, the distance between the light-emitting element 12 and the lens 66 is kept constant. Thus, when a number of (a plurality of) such light-emitting devices 10 are manufactured, the degree of divergence or convergence of the light that has passed through the lens 66 is prevented from varying, i.e., light distribution characteristics and the quality of the light-emitting device 10 are prevented from varying. Furthermore, since the mounting teeth 70a, 70b and the mounting teeth 70c, 70d on the protrusions 62a, 62b are fitted respectively in the mounting holes 52a, 52b and the mounting holes 52c, 52d that are defined respectively in the side walls 46a, 46b, the board 14 can be stably held in position.

According to the present embodiment, with the cover 24 being mounted in the case 22, the outer side surfaces of the ridges 68a, 68b of the cover 24 are held in contact with the second vertical surfaces 47a, 47b of the case body 36. Therefore, the cover 24 and the board 14 are suitably prevented from moving relatively to each other in their transverse directions. The light-emitting element 12 is thus held substantially at the center of the lens 66, so that the quality of the light-emitting device 10 is further prevented from varying.

According to the present embodiment, moreover, the lower end face 73 of the terminal holder 72 is held in abutment against the lead sections 34 of the connection terminals 20a, 20b accommodated in the placement grooves 56a, 56b. Consequently, the connection terminals 20a, 20b is suitably held in the case 22.

As there is no need for parts for holding the connection terminals 20a, 20b, the light-emitting device 10 as a whole can effectively be reduced in size and weight. Since the connection terminals 20a, 20b are fixed to the board 14 by the adhered sections 30, the board 14 is more stably held in position by holding the connection terminals 20a, 20b.

Usually, the case 22 has a dimensional tolerance. Therefore, when the board 14 with the light-emitting element 12, the connection terminals 20a, 20b, etc. being mounted thereon is positioned in the case 22, for example, the lead sections 34 of the connection terminals 20a, 20b may slightly be lifted out of the placement grooves 56a, 56b.

Even in this case, with the light-emitting device 10 according to the present embodiment, since the connection terminals 20a, 20b have the respective curved sections 32, when the cover 24 is mounted in the case 22, by bending the curved sections 32, the connection terminals 20a, 20b can be held without applying undue stress to the adhered sections 30. The adhered sections 30 are thus prevented from suffering a connection failure.

The lower end face 73 of the terminal holder 72 has the pair of recesses 74a, 74b defined therein, so that the curved sections 32 of the connection terminals 20a, 20b are prevented from touching the cover 24, thereby making it less difficult to mount the cover 24 in the case 22. The light-emitting device 10 is made more compact in its entirety than if the recesses 74a, 74b are not defined in the lower end face 73 of the terminal holder 72, but a space is created between the curved sections 32 and the lower end face 73 to prevent the curved sections 32 from touching the lower end face 73.

According to the present embodiment, furthermore, as the electronic component 18 is disposed on the mounting surface 16 of the board 14 on which the light-emitting element 12 is mounted, the light-emitting device 10 as a whole can suitably be made smaller in size and weight than if the electronic component 18 is mounted on the reverse side 28 of the board 14.

According to the present embodiment, in a case where it is desired to reduce a shock applied from the lead sections 34 to the adhered sections (attached sections) 30, since the curved sections 32 are provided between the adhered sections 30 and the lead sections 34, when the connector for supplying electric power, not shown, is connected to the lead sections 34, a shock acting on the adhered sections 30 can appropriately be reduced by the curved sections 32. The connection terminals are curved at the curved sections and then extend at the lead sections. Since the connection terminals are spaced (lowered) in a direction away from the cover, the connection terminals contribute to a reduction in the size of the light-emitting device.

According to the present invention, the mounting holes 52a through 52d are through holes, and thus it is possible to easily confirm that the cover 24 is reliably mounted in the case 22. The case body 36 is made compact in its heightwise directions (vertical directions) with respect to the connector 38.

The electronic component 18 is disposed between the light-emitting element 12 and the through holes 26a, 26b (terminal attachment regions) and has its longitudinal directions aligned with the directions along which the connection terminals 20a, 20b are juxtaposed.

The case 22 and the cover 24 are narrower on the connector side than on the lens side. The recesses 74a, 74b are formed as clearance areas at positions facing the curved sections 32 of the connection terminals 20a, 20b. The clearance areas may be of a beveled shape.

The present embodiment is not limited to the structural details described above. A cushioning member may be interposed between the cover 24 and the board 14 while a portion of the cover 24 is held in abutment against the surface 16 of the board 14. The ridges 68a, 68b of the cover 24 may comprise cushioning members.

First Modification

A light-emitting device 10A according to a first modification will be described below with reference to FIGS. 9 through 16. In the present modification, parts which have identical or similar functions and effects to those according to the above embodiment are denoted by identical reference characters, and will not be described in detail below. This holds true for a third modification and a fourth modification to be described later.

Figure 9:
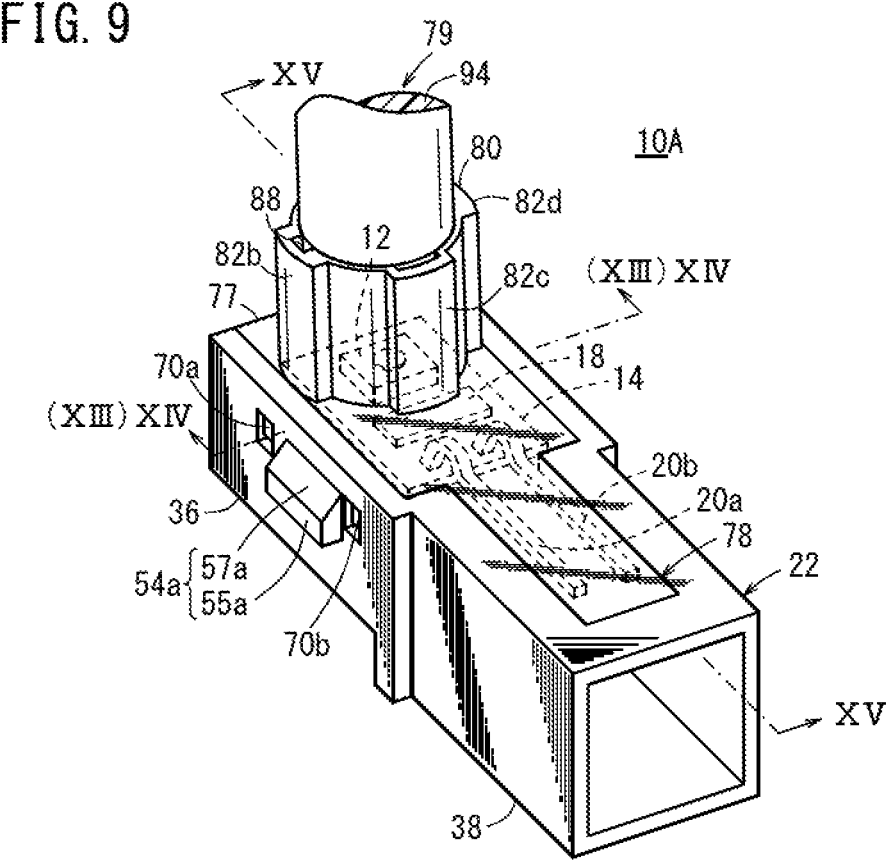
FIG. 9 is a perspective view of a light-emitting device according to a first modification.
Figure 10:
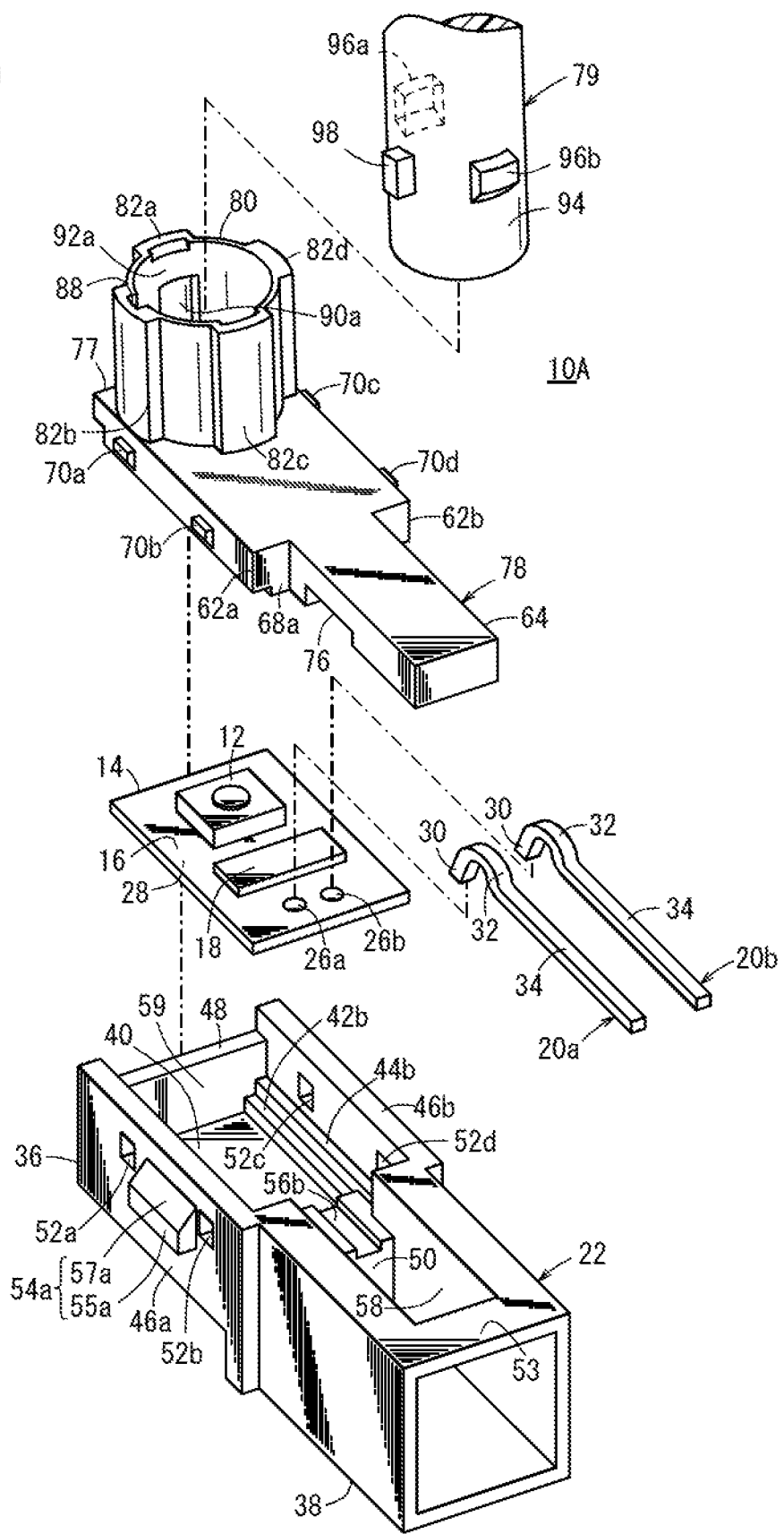
FIG. 10 is an exploded perspective view of the light-emitting device shown in FIG. 9.
Figure 11:
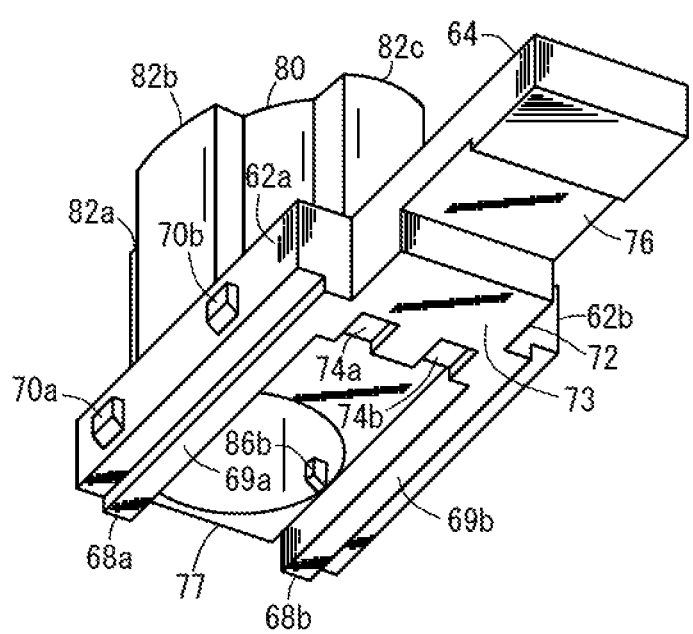
FIG. 11 is a perspective view of a cover of the light-emitting device shown in FIG. 10, as viewed from behind.

As shown in FIGS. 9 through 11, the light-emitting device 10A according to the first modification has a cover 78 instead of the cover 24 of the light-emitting device 10 described above. The cover 78 is integrally formed of resin or the like by injection molding, and has a tubular portion 80 integrally formed with a main cover body 77 and in which a light guide body (light guide) 79 can be mounted.

The tubular portion 80 is substantially in the form of a hollow cylinder positioned near one end of the main cover body 77. The inside (inner hole) of the tubular portion 80 is open at a lower end face of the main cover body 77, or in other words the main cover body has a through-hole defined therein which communicates with an inner hole of the tubular portion. As shown, the protrusions 62a, 62b are disposed on opposite sides of the through-hole, the protrusions extend a distance along their longitudinal direction which is greater than a diameter of the through-hole, and in a direction along which the through-hole extends, ends of the protrusions are positioned farther from a center of the through-hole than are ends of through-hole. The tubular portion 80 has four thick regions 82a, 82b, 82c, 82d spaced circumferentially from each other. The thick regions 82a, 82b, 82c, 82d extend fully along the axial directions of the tubular portion 80 and have substantially identical circumferential lengths.

The thick region 82a and the thick region 82c are arrayed along the longitudinal directions of the main cover body 77, whereas the thick region 82b and the thick region 82d are arrayed along the transverse directions of the main cover body 77.

Figure 13:
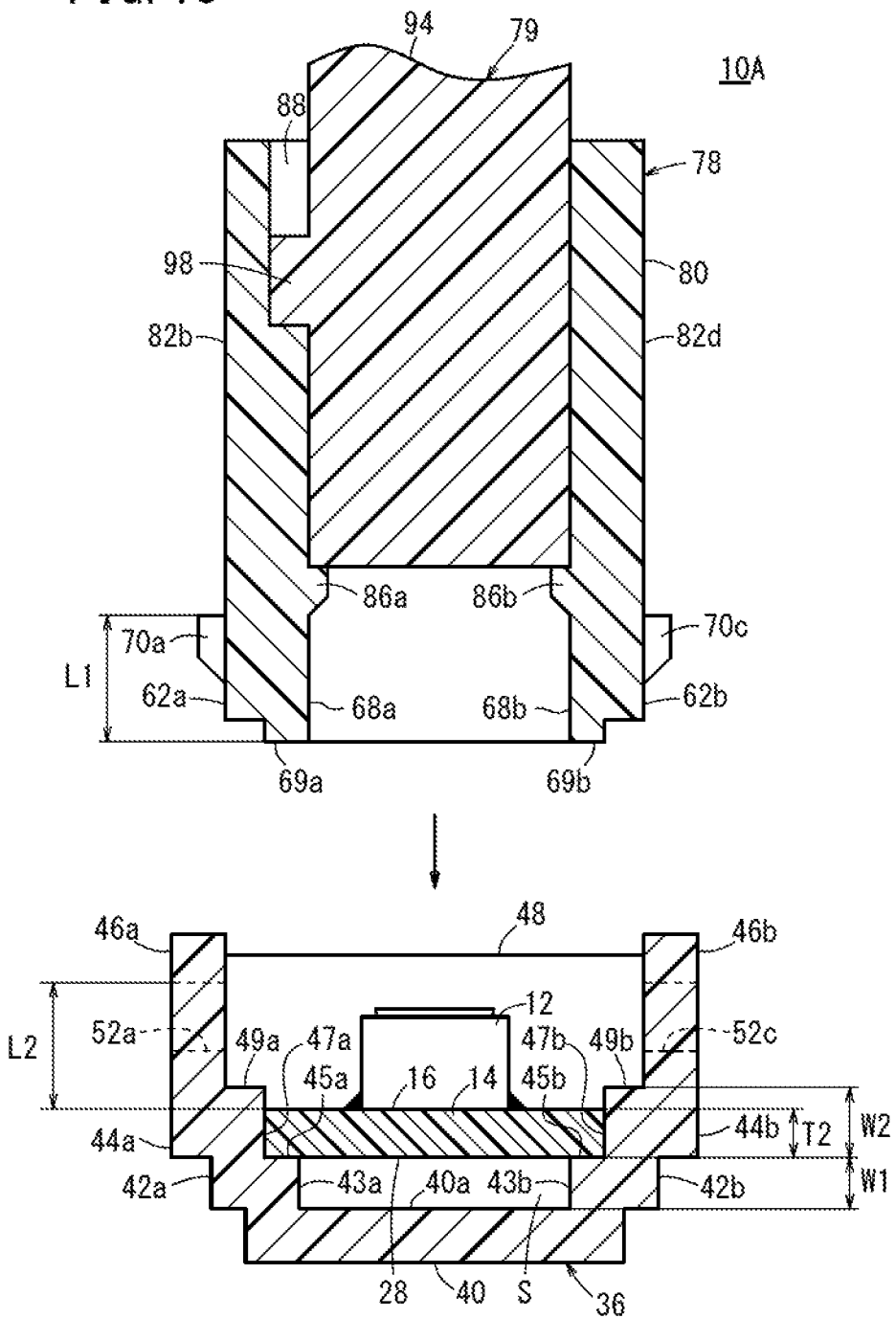
FIG. 13 is a cross-sectional view taken along line XIII-XIII of FIG. 9 before the cover is mounted in place.
Figure 14:
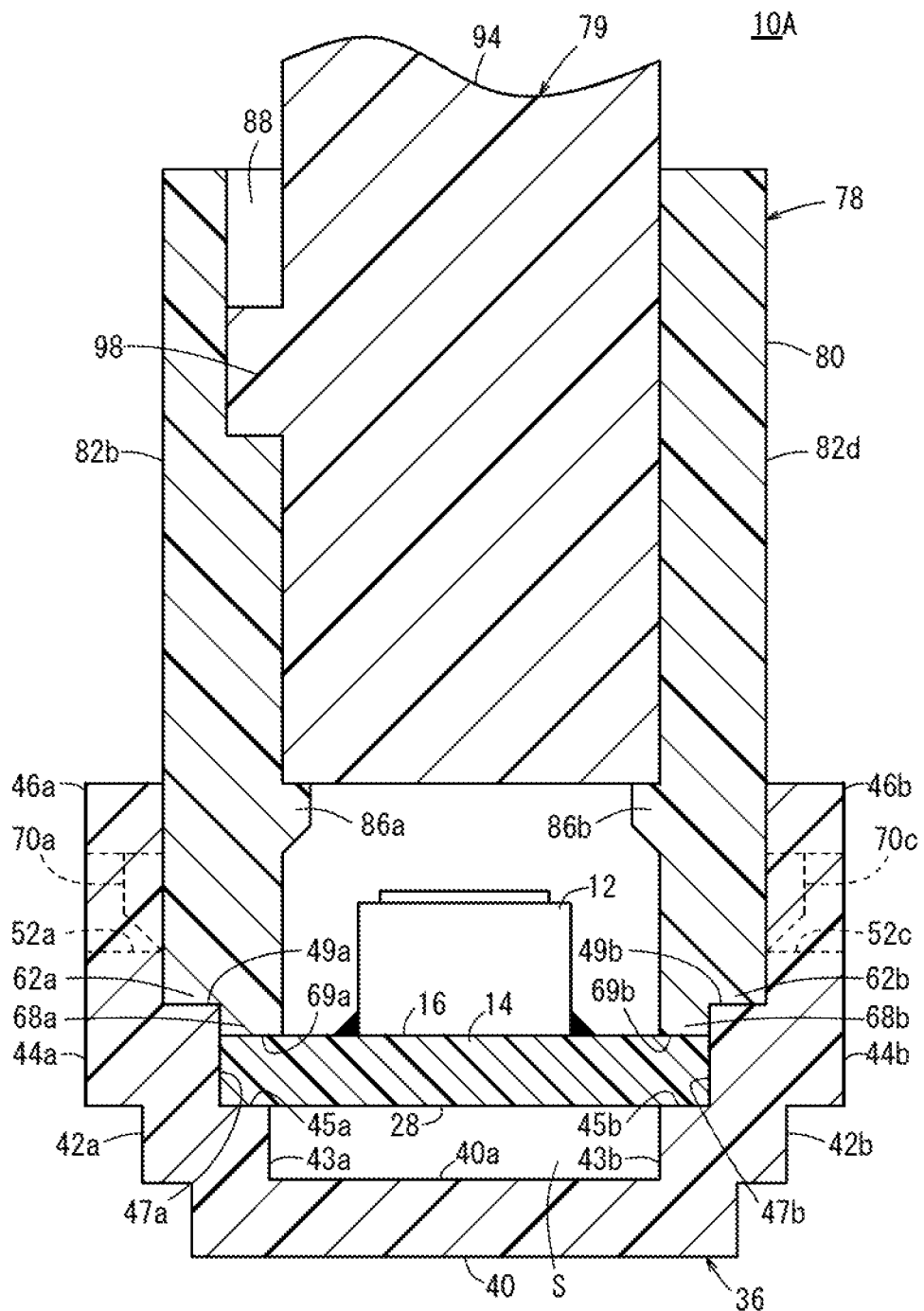
FIG. 14 is a cross-sectional view taken along line XIV-XIV of FIG. 9 after the cover is mounted in place.
Figure 15:
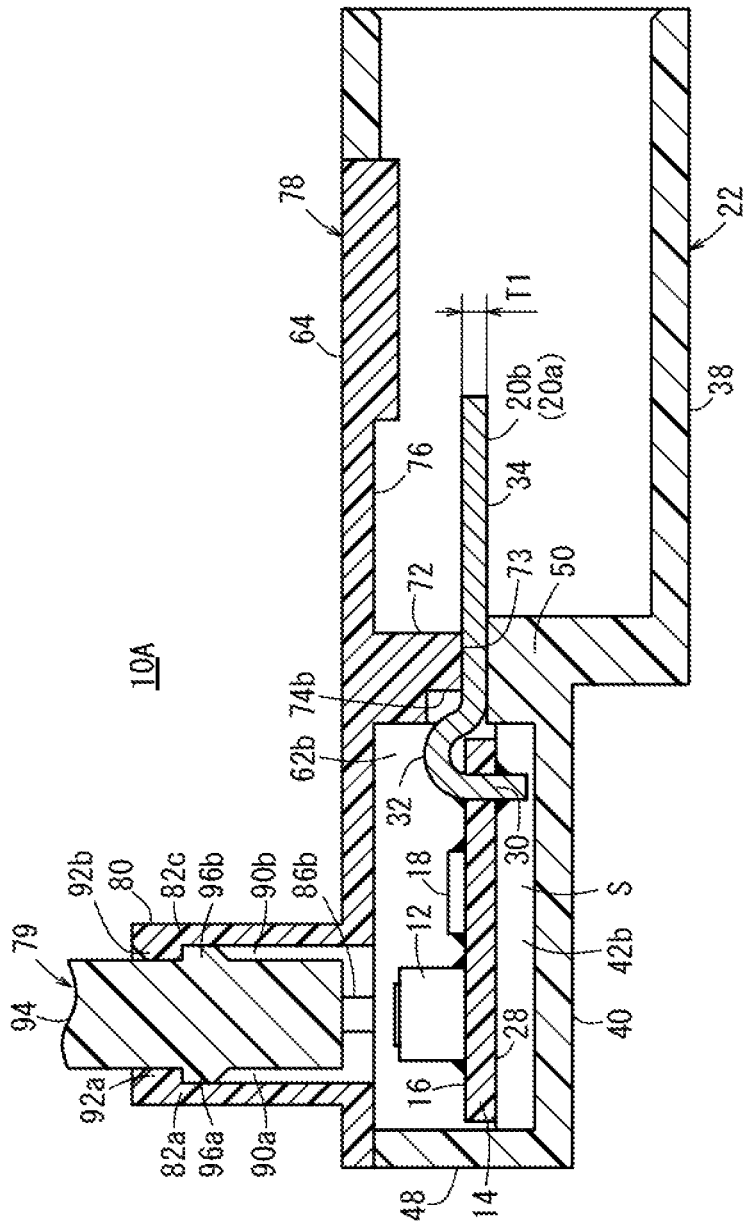
FIG. 15 is a cross-sectional view taken along line XV-XV of FIG. 9.

The thick region 82b has a first stopper 86a on a lower end portion of an inner circumferential surface thereof, and the thick region 82d has a first stopper 86b on a lower end portion of an inner circumferential surface thereof, the first stopper 86b facing the first stopper 86a (see FIG. 13). The thick region 82b has an engaging groove 88 defined in an upper end portion of the inner circumferential surface thereof, the engaging groove 88 extending axially of the tubular portion 80 and being open at an upper end face of the tubular portion 80. The engaging groove 88 may not be open at the upper end face of the tubular portion 80. In other words, an upper end of the engaging groove 88 may be positioned slightly beneath the upper end face of the tubular portion 80. Each of the first stoppers 86a, 86b is substantially in the shape of a rectangular parallelepiped and has an upper end face formed flatwise.

Figure 12:
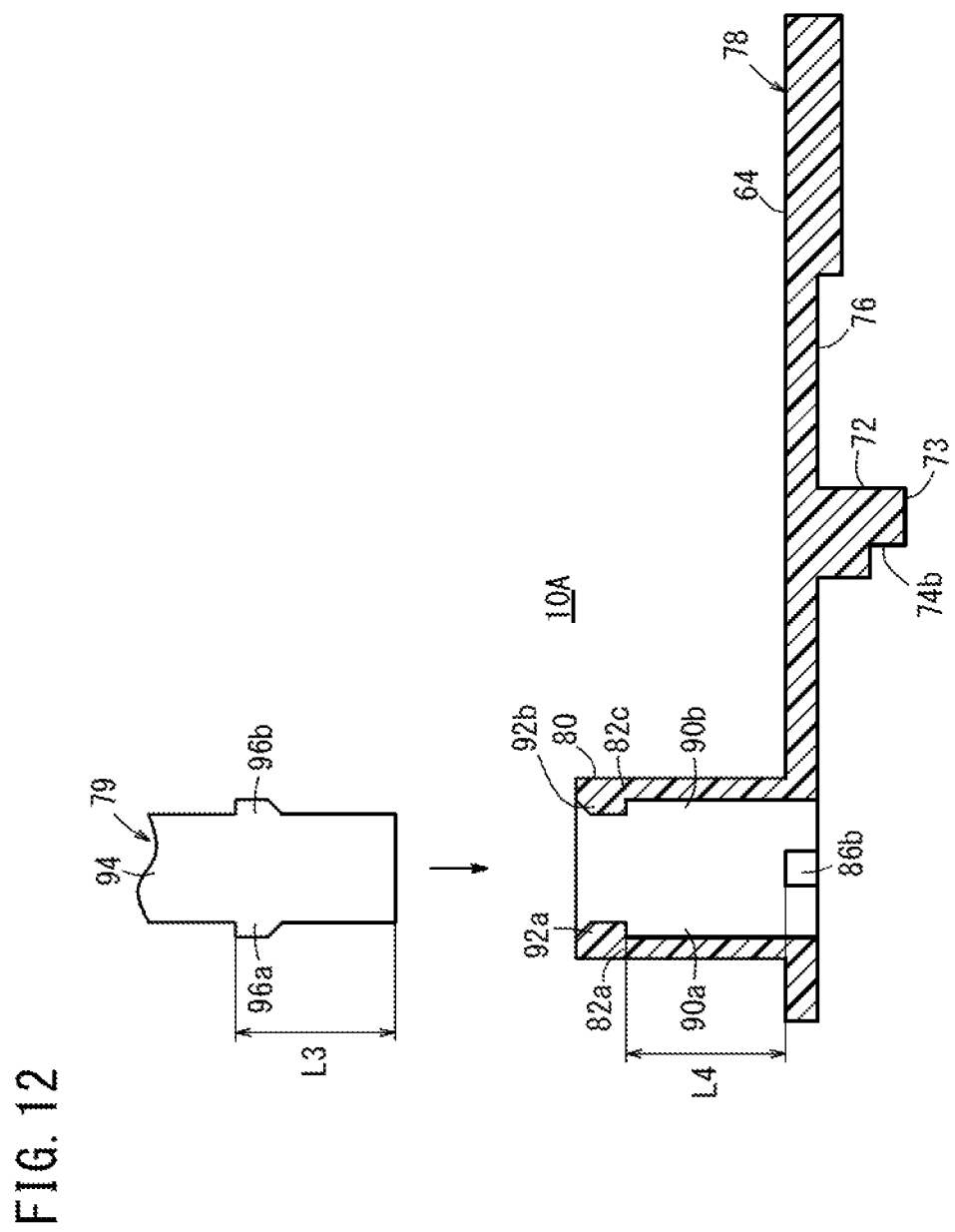
FIG. 12 is a cross-sectional view illustrating a procedure for installing a light guide body in a tubular portion of the cover.

As shown in FIG. 12, the thick region 82a has a groove 90a defined in an inner circumferential surface thereof and extending axially of the tubular portion 80. The groove 90a extends from a position that is slightly beneath the upper end of the tubular portion 80 to the lower end of the tubular portion 80, whereby a second stopper 92a is formed on an upper end portion of the inner circumferential surface of the thick region 82a for abutment against (engagement with) a convexity 96a of the light guide body 79 to be described later.

The thick region 82c has a groove 90b defined in an inner circumferential surface thereof. The groove 90b is identical in shape to the groove 90a and faces the groove 90a. Thus, a second stopper 92b is formed on an upper end portion of the inner circumferential surface of the thick region 82c for abutment against (engagement with) a convexity 96b of the light guide body 79 to be described later. Each of the second stoppers 92a, 92b is of a tapered shape that is progressively thinner toward the upper end thereof and has a lower end face formed flatwise.

The light guide body 79 is transparent and integrally constructed of a resin material. As shown in FIGS. 10, 12, and 13, the light guide body 79 has a cylindrical main light guide body 94, a pair of convexities 96a, 96b formed on an outer circumferential surface of the main light guide body 94 and insertable respectively into the grooves 90a, 90b described above, and a substantially rectangular parallelepipedic engaging projection 98 disposed on the outer circumferential surface of the main light guide body 94 and extending axially of the main light guide body 94.

The main light guide body 94 has an outside diameter corresponding to the inside diameter of the tubular portion 80. Each of the convexities 96a, 96b is substantially in the shape of a rectangular parallelepiped. Each of the convexities 96a, 96b has a lower end portion of a tapered shape that is progressively thinner downwardly and an upper end face formed flatwise. The convexities 96a, 96b are set to a size insertable into the grooves 90a, 90b.

The distance L3 from the lower end face of the main light guide body 94 to the upper end faces of the convexities 96a, 96b is substantially the same as the distance L4 from the upper end faces of the first stoppers 86a, 86b to the lower end faces of the second stoppers 92a, 92b, for reasons to be described later.

The engaging projection 98 has a width (a length along a direction perpendicular to the axial and radial directions of the main light guide body 94) which is substantially the same as the width of the engaging groove 88. When the engaging projection 98 is inserted in the engaging groove 88, the engaging projection 98 is held in contact with a pair of side surfaces of the engaging groove 88, so that the light guide body 79 is reliably positioned with respect to the tubular portion 80 in the circumferential directions of the tubular portion 80. The light guide body 79 is thus prevented from being assembled in error in the tubular portion 80. Furthermore, the light guide body 79 that is mounted in the tubular portion 80 is suitably prevented from rotating in the circumferential directions of the tubular portion 80.

According to the present modification, for assembling the light-emitting device 10A, the light guide body 79 is mounted in the tubular portion 80. Specifically, as shown in FIG. 12, the light guide body 79 is adjusted in orientation with respect to the cover 78 such that the engaging projection 98 can be inserted into the engaging groove 88, and then is moved into the tubular portion 80. Then, while the outer circumferential surface of the main light guide body 94 and the inner circumferential surface of the tubular portion 80 are held in contact with each other, the tapered surfaces of the convexities 96a, 96b are brought into contact with the tapered surfaces of the second stoppers 92a, 92b.

Then, when the light guide body 79 is pressed toward the main cover body 77, the light guide body 79 is further moved into the tubular portion 80 while the thick regions 82a, 82c are elastically deformed in directions away from each other (radially outwardly of the tubular portion 80), until the lower end face of the main light guide body 94 abut against the upper end faces of the first stoppers 86a, 86b. At this time, the thick regions 82a, 82c that have been elastically deformed return to their respective original shapes, and the engaging projection 98 is disposed in the engaging groove 88 and the convexities 96a, 96b are disposed in the grooves 90a, 90b.

As described above, the distance L3 from the lower end face of the main light guide body 94 to the upper end faces of the convexities 96a, 96b is substantially the same as the distance L4 from the upper end faces of the first stoppers 86a, 86b to the lower end faces of the second stoppers 92a, 92b. Therefore, the upper end face of the convexity 96a abuts against the lower end face of the second stopper 92a, and the upper end face of the convexity 96b abuts against the lower end face of the second stopper 92b. As a result, the light guide body 79 is positioned and held in the tubular portion 80 (see FIG. 15). At this time, the main light guide body 94 has a portion projecting from the tubular portion 80.

Figure 16:
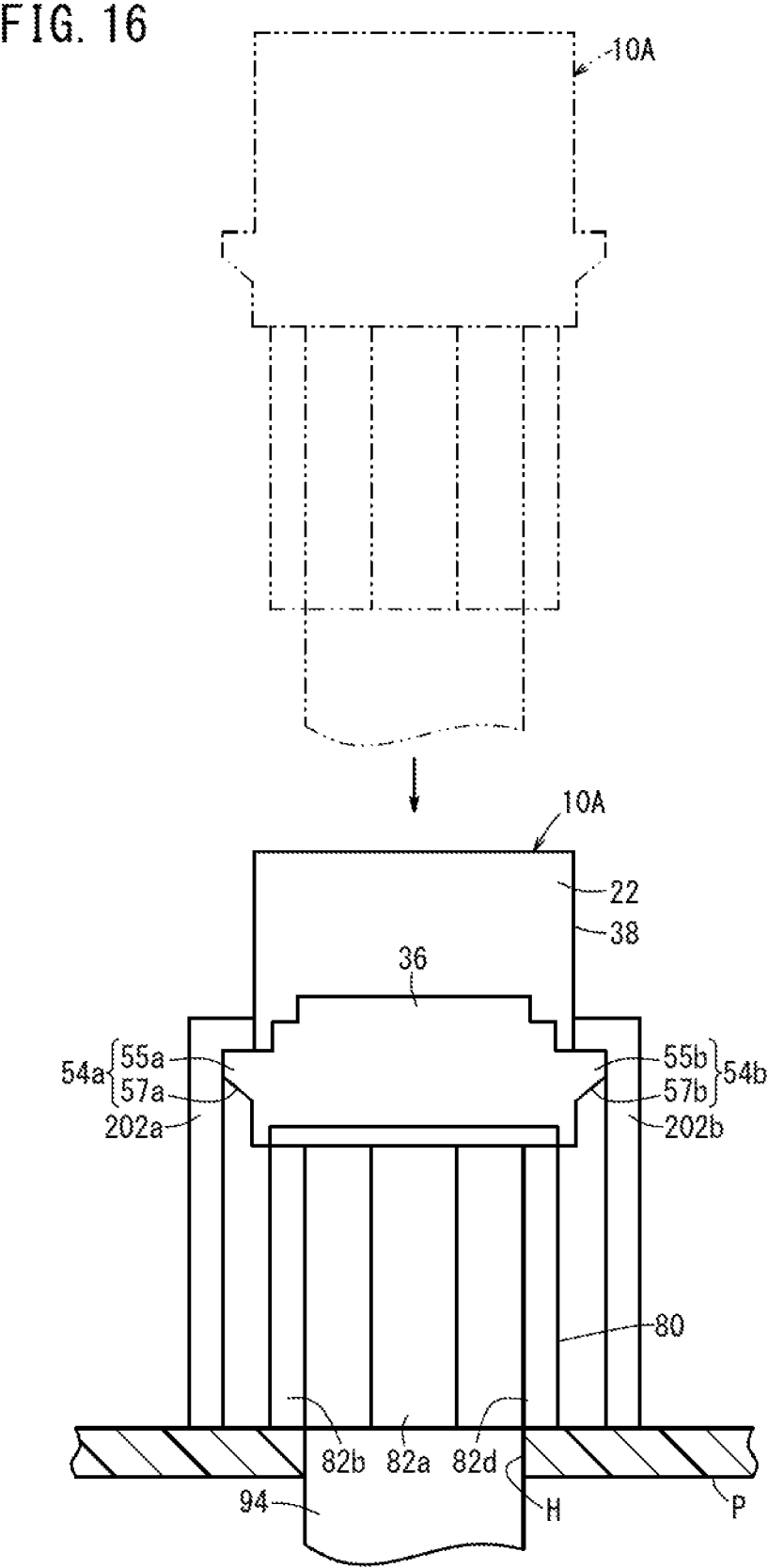
FIG. 16 is a plan view, partly in cross section, of the light-emitting device according to the first embodiment of the present invention which is disposed on a vehicle body panel.

As shown in FIG. 16, the light-emitting device 10A thus assembled is disposed in a predetermined position on the vehicle body panel P of a vehicle, not shown. Specifically, the light-emitting device 10A is set (in a position indicated by the two-dot-and-dash lines in FIG. 16) on the side of the reverse side of the vehicle body panel P such that an opening of the tubular portion 80 remote from the board 14 is oriented vertically downwardly and a window H defined in the vehicle body panel P faces the main light guide body 94, and the light-emitting device 10A is moved toward the vehicle body panel P. Then, resin-made retaining portions 202a, 202b provided on the reverse side of the vehicle body panel P are brought into contact with the tapered portions 57a, 57b of the fixing fingers 54a, 54b of the light-emitting device 10A.

When the light-emitting device 10A is further pressed toward the vehicle body panel P, the light-emitting device 10A moves toward the vehicle body panel P while the retaining portions 202a, 202b are being elastically deformed in directions away from each other, until the tubular portion 80 is brought into abutment against the reverse side of the vehicle body panel P and a portion of the main light guide body 94 is fitted into the window H and exposed to the interior of the passenger compartment of the vehicle. At this time, the retaining portions 202a, 202b which have been elastically deformed return to their respective original shapes. As a consequence, the light-emitting device 10A is gripped by the vehicle body panel P and the retaining portions 202a, 202b, and thus the light-emitting device 10A is securely fixed to the vehicle body panel P.

According to the light-emitting device 10A of the present modification, since the lower end face of the main light guide body 94 is held in abutment against the upper end faces of the first stoppers 86a, 86b while the light guide body 79 is mounted in the tubular portion 80, the movement of the light guide body 79 toward the board 14 is suppressed (prevented). The light guide body 79 is thus positioned in the tubular portion 80.

Furthermore, inasmuch as the upper end faces of the convexities 96a, 96b, in the above state, are held in abutment against the lower end faces of the second stoppers 92a, 92b, the movement of the light guide body 79 away from the board 14 is suppressed (prevented). Therefore, for example, even if the light-emitting device 10A is oriented such that the opening of the tubular portion 80 remote from the board 14 is oriented vertically downwardly, the light guide body 79 is not displaced in position with respect to the tubular portion 80. The distance between the light-emitting element 12 and the light guide body 79 is thus kept constant regardless of the orientation of the light-emitting device 10A.

According to the present modification, since the light guide body 79 is positioned and held in the tubular portion 80 using the first stoppers 86a, 86b and the second stoppers 92a, 92b, it is not necessary to form holes in the wall of the tubular portion 80 for holding the light guide body 79. Consequently, the light emitted from the light-emitting element 12 is free from the problem of leaking out through such holes. Accordingly, the quality of the light-emitting device 10A is increased without involving an increase in the number of parts used.

According to the present embodiment, as the convexities 96a, 96b capable of abutting against the second stoppers 92a, 92b are integrally formed with the outer surface of the main light guide body 94, when the light guide body 79 is inserted into the tubular portion 80, the convexities 96a, 96b are pressed against the second stoppers 92a, 92b, whereby the thick regions 82a, 82c are bent radially outwardly of the tubular portion 80. The light guide body 79 can thus easily be inserted into the tubular portion 80.

The light guide body 79 is pressed toward the main cover body 77 while the tapered surfaces of the convexities 96a, 96b of the light guide body 79 are held in contact with the tapered surfaces of the second stoppers 92a, 92b. Therefore, the thick regions 82a, 82c can easily be bent radially outwardly of the tubular portion 80, so that the light guide body 79 can more easily be inserted into the tubular portion 80.

The first stoppers 86a, 86b are disposed in confronting relation to each other along the transverse directions of the main cover body 77, and the second stoppers 92a, 92b are disposed in confronting relation to each other along the longitudinal directions of the main cover body 77. Therefore, the light guide body 79 can be positioned and held in the tubular portion 80 in a more well-balanced fashion than, for example, if one first stopper 86a and one second stopper 92a are provided (i.e., the first stopper 86b and the second stopper 92b are omitted). When the cover 78 is to be formed by injection molding, a core disposed in the tubular portion 80 can be made up of separate members of suitable size for easy removal of the core from the tubular portion.

With the light-emitting device 10A according to the present modification, the protrusions 62a, 62b of the cover 78 presses the mounting surface 16 of the board 14 with the light-emitting element 12 being disposed between the protrusions 62a, 62b, and the mounting teeth 70a, 70b and the mounting teeth 70c, 70d disposed respectively on the protrusions 62a, 62b are fitted respectively in the mounting holes 52a, 52b and the mounting holes 52c, 52d defined respectively in the side walls 46a, 46b. Therefore, the distance between the light-emitting element 12 and the light guide body 79 is kept constant.

According to the present modification, with the cover 78 being mounted in the case 22, the outer side surfaces of the ridges 68a, 68b of the cover 78 are held in contact with the second vertical surfaces 47a, 47b of the case body 36. Therefore, the optical axis of the light-emitting element 12 is positioned on the axis of the tubular portion 80.

According to the present modification, since the engaging groove 88 and the engaging projection 98 function as a rotation limiter, the light guide body 79 that is mounted in the tubular portion 80 is suitably prevented from rotating in the circumferential directions of the tubular portion 80.

According to the present modification, the mounting tooth 70a, the mounting tooth 70c, the thick region 82b, and the thick region 82d are arranged side by side in the width-wise direction of the light-emitting device 10B. The first stoppers 86a, 86b are disposed in positions facing the thick regions 82b, 82d.

Second Modification

A light-emitting device 10B according to a second modification will be described below with reference to FIGS. 17 and 18. In the present modification, parts which have identical or similar functions and effects to those according to the first modification are denoted by identical reference characters, and will not be described in detail below.

Figure 17:
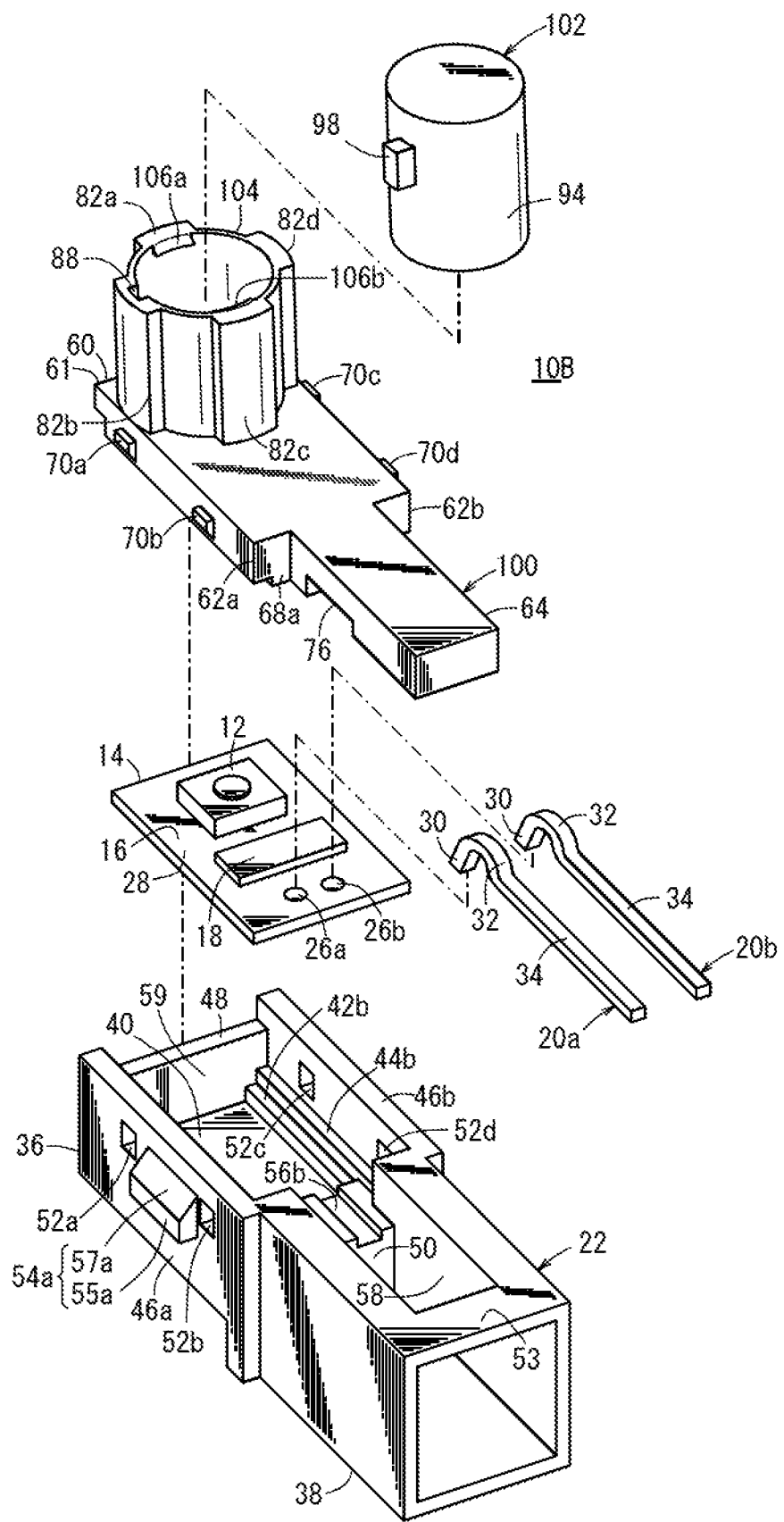
FIG. 17 is an exploded perspective view of a light-emitting device according to a second modification of the present invention.
Figure 18:
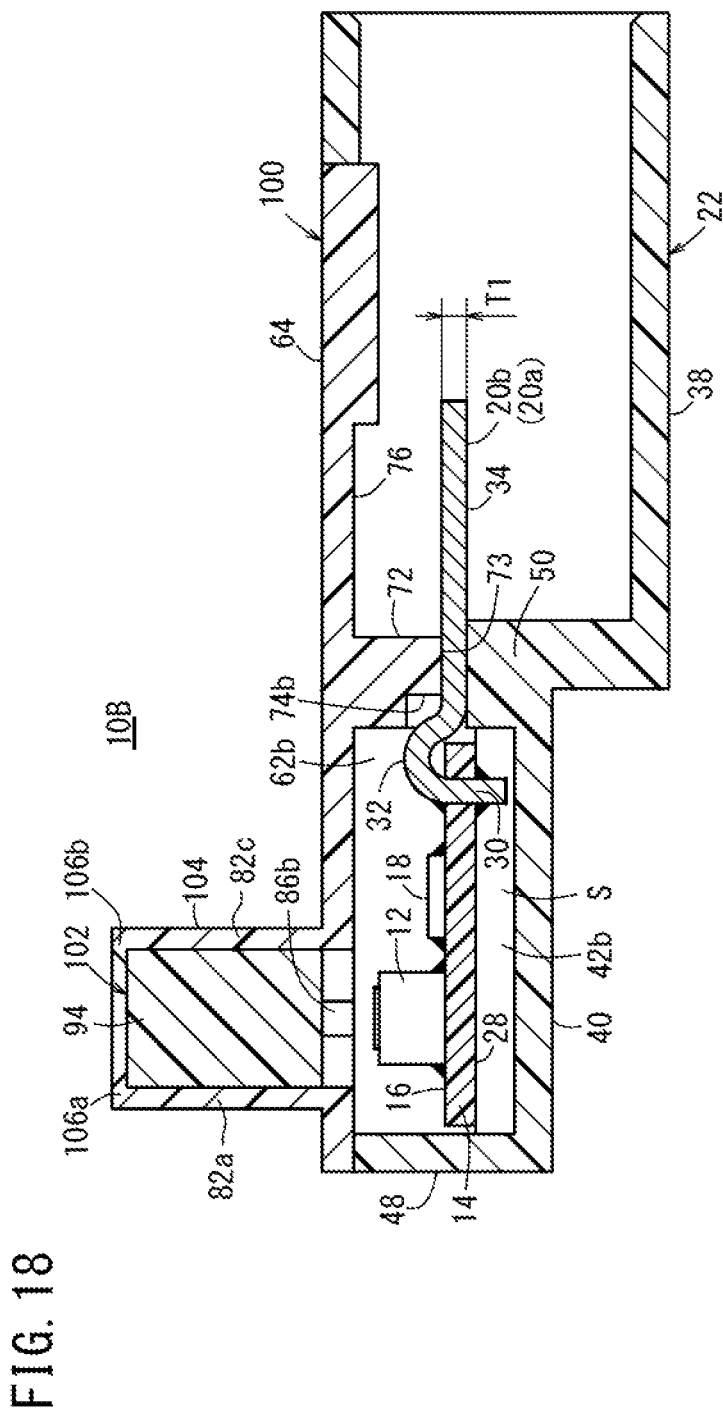
FIG. 18 is a cross-sectional view of the light-emitting device shown in FIG. 17.

As shown in FIGS. 17 and 18, the light-emitting device 10B according to the second modification has a cover 100 and a light guide body 102 which are different in structure from the cover 78 and the light guide body 79 described above. Specifically, the cover 100 has a tubular portion 104.

The tubular portion 104 has a second stopper 106a projecting from an upper end of an inner circumferential surface of the thick region 82a, and a second stopper 106b projecting from an upper end of an inner circumferential surface of the thick region 82c. Each of the second stoppers 106a, 106b is of a tapered shape that is progressively thinner toward the upper end thereof. The tubular portion 104 is not provided with the grooves 90a, 90b described above. The light guide body 102 is not provided with the convexities 96a, 96b described above.

With the light-emitting device 10B according to the present modification, in a state where the light guide body 102 is mounted in the tubular portion 104, the lower end face of the main light guide body 94 is held in abutment against the upper end faces of the first stoppers 86a, 86b, and the upper end face of the main light guide body 94 is held in abutment against the lower end faces of the second stoppers 106a, 106b, whereby the light guide body 102 is positioned and held in the tubular portion 104.

Further, since it is not necessary to provide the convexities 96a, 96b described above on the outer circumferential surface of the main light guide body 94, the light guide body 102 is of a simpler structure. As a result, the light-emitting device 10B can be manufactured at a reduced cost.

Third Modification

Figure 19:
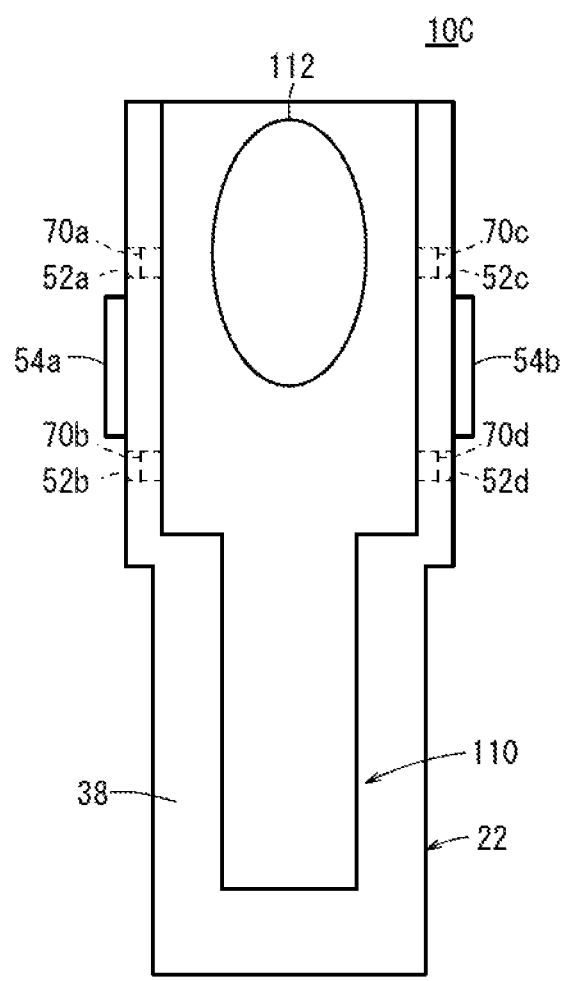
FIG. 19 is a plan view of a light-emitting device according to a third modification of the present invention.

A light-emitting device 10C according to a third modification will be described below with reference to FIG. 19. As shown in FIG. 19, the light-emitting device 10C according to the third modification has a cover 110 which is different in structure from the cover 24 described above. The cover 110 has a lens 112 formed thereon and which is of an elliptical shape as viewed in plan. The lens 112 has a major axis extending along the longitudinal direction of the cover 110.

In the present modification, when the light-emitting device 10C is assembled, the lens 112 is positioned between the mounting tooth 70a and the mounting tooth 70c, and positioned between the fixing finger 54a and the fixing finger 54c. In a case where it is desired to prevent the lens 112 from being displaced in position and to increase supporting rigidity for the lens 112, since the mounting tooth 70a, the mounting tooth 70c, the fixing finger 54a, and the fixing finger 54c are positioned in the vicinity of the lens 112, the lens 112 is suitably prevented from being displaced in position with respect to the case 22 and is also suitably prevented from being displaced in position with respect to the vehicle body panel P. In other words, the supporting rigidity for the lens 112 is increased.

Furthermore, as the light-emitting device 10C according to the present modification has the lens 112 which is of an elliptical shape as viewed in plan, for example, in a case where the light-emitting device 10C is used as a light-emitting device for illuminating a door pocket of the vehicle, it can illuminate the door pocket along its shape by aligning the major axis of the lens 112 with the direction in which the door pocket extends.

According to the present modification, moreover, since the lens 112 is of an elliptical shape as viewed in plan, the light-emitting device 10C can be made compact in the widthwise direction thereof.

Fourth Modification

Figure 20:
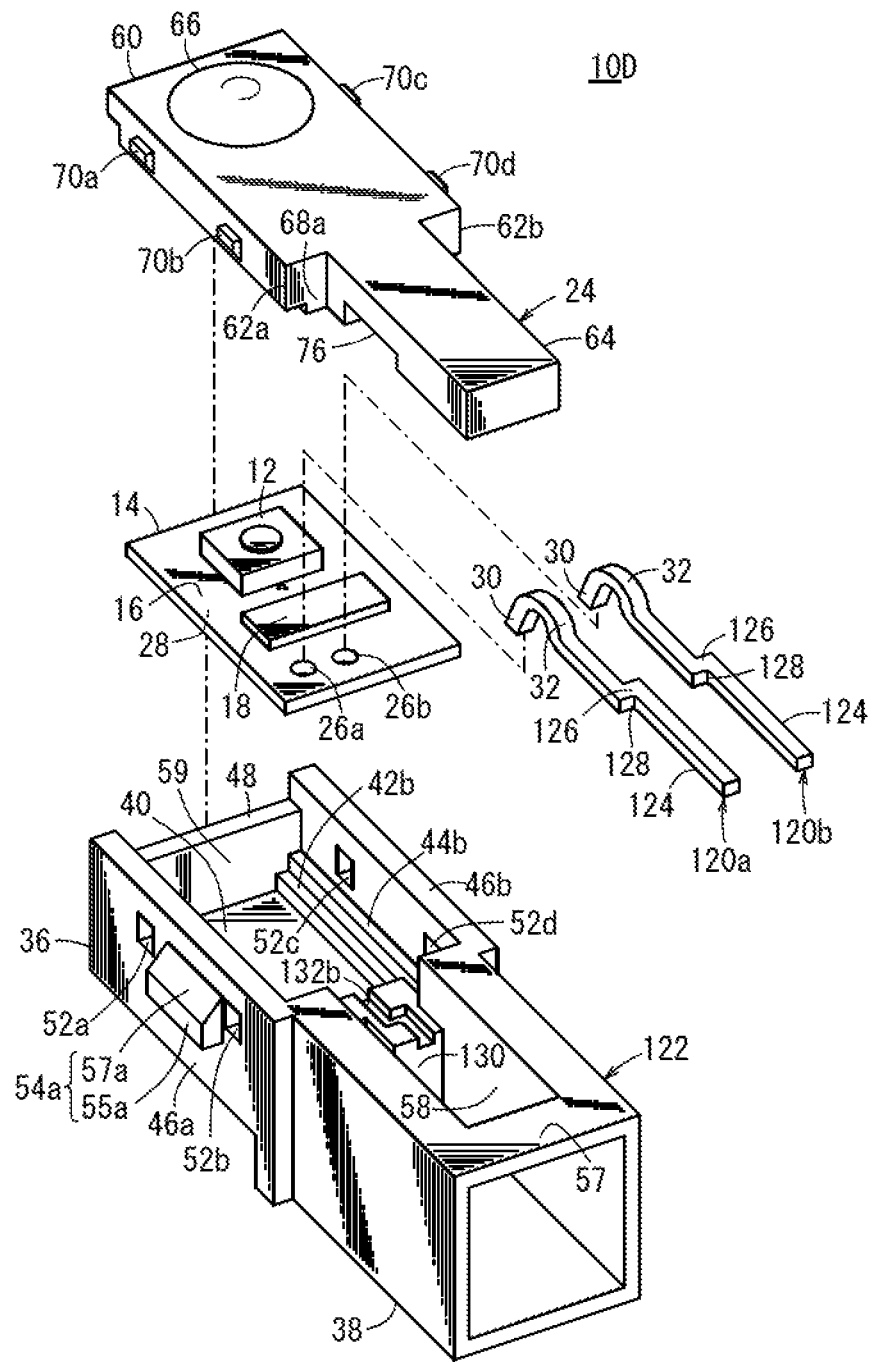
FIG. 20 is an exploded perspective view of a light-emitting device according to a fourth modification of the present invention.

A light-emitting device 10D according to a fourth modification will be described below with reference to FIGS. 20 and 21. As shown in FIG. 20, the light-emitting device 10D according to the fourth modification has connection terminals 120a, 120b and a case 122 which are different in structure from the connection terminals 20a, 20b and the case 22 described above.

Specifically, the connection terminal 120a has the adhered section 30, the curved section 32, and a lead section 124. The lead section 124 extends from the other end of the curved section 32 in a direction away from the adhered section 30, is bent substantially 90 degrees in a widthwise direction thereof, is further bent substantially 90 degrees, and extends in the direction away from the adhered section 30. In other words, the lead section 124 includes a bent portion 126 formed therein.

According to the present modification, a round chamfered portion 128 is disposed between the other end of the lead section 124 (i.e., remote from the adhered section 30) and the bent portion 126. The lead section 124 is of substantially the same width in its entirety. The connection terminal 120b is identical in structure to the connection terminal 120a, and hence will not be described in detail below.

As shown in FIG. 21, the case 122 has a wall 130 disposed between the case body 36 and the connector 38. The wall 130 has, on an upper surface thereof, a placement groove 132a in which the lead section 124 of the connection terminal 120a is placed, and a placement groove 132b in which the lead section 124 of the connection terminal 120b is placed.

The placement groove 132a includes a bent groove portion 134 of a shape corresponding to the shape of the bent portion 126 of the lead section 124. The placement groove 132b is identical in structure to the placement groove 132a.

According to the present modification, the through holes 26a, 26b in the board 14 are shifted in position to one side from the widthwise center of the board 14, so that the other ends of the connection terminals 120a, 120b are symmetrically disposed in the widthwise directions with respect to the axis of the connector 38.

With the light-emitting device 10D according to the present modification, the connection terminals 120a, 120b have the respective bent portions 126, and the placement grooves 132a, 132b have the respective bent groove portions 134 of shapes corresponding to the shapes of the bent portions 126. In a case where it is desired to minimize damage to the adhered sections (attached sections) 30, since the bent portions 126 abut against side wall surfaces of the bent groove portions 134, i.e., the side wall surfaces act as load receiving portions, when the connector, not shown, is connected to the other ends of the lead sections 124 of the connection terminals 120a, 120b, it is possible to prevent excessive stress from being applied to the adhered sections 30. Therefore, the adhered sections 30 are appropriately prevented from being damaged.

According to the present modification, each of the connection terminals 120a, 120b may be provided with a plurality of bent portions 126. In this case, by bending the bent portions 126 in one direction, the plural bent portions 126 contribute to making the light-emitting device 10C compact in the widthwise directions.

The present invention is not limited to the above embodiments, but may employ various arrangements without departing from the scope of the invention. The light-emitting devices according to the present invention are not limited to an application for illuminating the passenger compartment of a vehicle.

For example, the light-emitting devices 10, 10A through 10D may incorporate a plurality of light-emitting elements 12 mounted on the board 14.

The light-emitting devices 10, 10A through 10D may be arranged such that the distance L1 from the lower end faces 69a, 69b of the ridges 68a, 68b to the upper end faces of the mounting teeth 70a, 70b, 70c, 70d is the same as the distance L2 from the mounting surface 16 of the board 14 to the upper ends of the mounting holes 52a, 52b, 52c, 52d. In this case, the board 14 is not essentially pressed by the ridges 68a, 68b, but can be held with respect to the case body 36 by contact resistance between the lower end faces 69a, 69b of the ridges 68a, 68b and the mounting surface 16 of the board 14.

Instead of the mounting teeth 70a, 70b, 70c, 70d, mounting holes may be defined in the protrusions 62a, 62b of the covers 24, 78, 100, 110, and instead of the mounting holes 52a, 52b, 52c, 52d, mounting teeth may be provided on the side walls 46a, 46b of the case body 36. In this case, the cover 24 can also easily be mounted in the case 22.

The numbers, positions, and shapes of the mounting holes 52a through 52d, the mounting teeth 70a through 70d, and the fixing fingers 54a, 54b can be changed appropriately.

The invention claimed is:

1. A light-emitting device comprising: a board; a light-emitting element mounted on a surface of the board; a support member on which the board is placed; a cover including a main cover body that has a plate shape covering the light-emitting element, and a tubular portion configured to mount a light guide body that guides light emitted from the light-emitting element; wherein the main cover body comprises: a base; a protrusion including a pair of protruded portions protruding from the base toward the board, the pair including a first protruded portion and a second protruded portion, the first protruded portion extending in a longitudinal direction of the base, the second protruded portion extending adjacent to the first protruded portion in the longitudinal direction of the base; and a ridge disposed on a protruded end of the second protruded portion, wherein a step is formed by the first protruded portion and the ridge, and wherein the protrusion and the ridge extend in a same direction along the base.

2. The light-emitting device according to claim 1, wherein the protrusion has a length same as a length of the ridge.

3. The light-emitting device according to claim 1, wherein the protrusion includes a pair of protrusions juxtaposed to each other, and the ridge includes a pair of ridges juxtaposed to each other, and the cover includes a ridge-joining section connecting ends of the pair of ridges.

4. The light-emitting device according to claim 1, wherein a through-hole is formed in the main cover body, the through-hole communicating with an inner hole of the tubular portion, and the first and second protruded portions are disposed adjacent to the through-hole in a plan viewed from an axial direction of the tubular portion.

5. The light-emitting device according to claim 4, wherein the first and second protruded portions extend a distance along the longitudinal direction which is greater than a diameter of the through-hole.

6. The light-emitting device according to claim 1, wherein the cover includes a joining section connecting ends of the first protruded portion and the second protruded portion.

7. The light-emitting device according to claim 1, wherein the cover includes a cover extension extending narrowly from the main cover body in a longitudinal direction and holding an external connector.

8. The light-emitting device according to claim 1, wherein a tooth is formed on an outer surface of each of the first protruded portion and the second protruded portion, and configured to engage the cover with the support member.

9. A light-emitting device comprising: a board; a light-emitting element mounted on a surface of the board; a support member on which the board is placed; a cover including a main cover body that has a plate shape covering the light-emitting element, and a tubular portion configured to mount a light guide body that guides light emitted from the light-emitting element; wherein the main cover body comprises: a base; a protrusion protruding from the base toward the board, the protrusion including a first protruded portion and a second protruded portion, the first protruded portion extending in a longitudinal direction of the base, the second protruded portion extending adjacent to the first protruded portion in the longitudinal direction of the base; and a ridge disposed on a protruded end of the second protruded portion, on a board side of the protrusion, wherein a step is formed by the first protruded portion and the ridge, and wherein the protrusion and the ridge extend in a same direction along the base.

10. The light-emitting device according to claim 9, wherein the protrusion has a length same as a length of the ridge.

11. The light-emitting device according to claim 9, wherein the cover includes a ridge-joining section connecting ends of the pair of ridges.

12. The light-emitting device according to claim 1, wherein the protrusion includes a pair of protrusions juxtaposed to each other, and the ridge includes a pair of ridges juxtaposed to each other, and the cover includes a ridge-joining section connecting ends of the pair of ridges.

13. The light-emitting device according to claim 9, wherein a through-hole is formed in the main cover body, the through-hole communicating with an inner hole of the tubular portion, and the first and second protruded portions are disposed adjacent to the through-hole in a plan viewed from an axial direction of the tubular portion.

14. The light-emitting device according to claim 13, wherein the first and second protruded portions extend a distance along the longitudinal direction which is greater than a diameter of the through-hole.

15. The light-emitting device according to claim 9, wherein the cover includes a joining section connecting ends of the first protruded portion and the second protruded portion.

16. The light-emitting device according to claim 9, wherein the cover includes a cover extension extending narrowly from the main cover body in a longitudinal direction and holding an external connector.

17. The light-emitting device according to claim 9, wherein a tooth is formed on each of the-first protruded portion and the second protruded portion, and configured to engage the cover with the support member.

* * * * *